US011311117B2

(12) United States Patent
Cummings

(10) Patent No.: US 11,311,117 B2
(45) Date of Patent: Apr. 26, 2022

(54) INFANT CARRIER

(71) Applicant: Kimberly Cummings, Newnan, GA (US)

(72) Inventor: Kimberly Cummings, Newnan, GA (US)

(*) Notice: Subject to any disclaimer, the term of this patent is extended or adjusted under 35 U.S.C. 154(b) by 0 days.

(21) Appl. No.: 16/067,062

(22) PCT Filed: Dec. 30, 2016

(86) PCT No.: PCT/US2016/069397
§ 371 (c)(1),
(2) Date: Jun. 28, 2018

(87) PCT Pub. No.: WO2017/117493
PCT Pub. Date: Jul. 6, 2017

(65) Prior Publication Data
US 2019/0014921 A1 Jan. 17, 2019

Related U.S. Application Data

(60) Provisional application No. 62/409,183, filed on Oct. 17, 2016, provisional application No. 62/273,938, filed on Dec. 31, 2015.

(51) Int. Cl.
A47D 13/02 (2006.01)
B62B 9/10 (2006.01)
(Continued)

(52) U.S. Cl.
CPC ......... *A47D 13/025* (2013.01); *B60N 2/2812* (2013.01); *B60N 2/2842* (2013.01);
(Continued)

(58) Field of Classification Search
CPC .. A47D 13/025; B60N 2/2812; B60N 2/2842; B60N 2/2881; B62B 9/108
(Continued)

(56) References Cited

U.S. PATENT DOCUMENTS 4,149,687 A  4/1979 Nunemacher
4,428,514 A  1/1984 Elf
(Continued)

FOREIGN PATENT DOCUMENTS

CN  102764002 A  11/2012
GB  2512085  * 3/2013  ............... B60N 2/28
(Continued)

OTHER PUBLICATIONS

Non Final Rejection dated Jun. 10, 2019 by the USPTO for U.S. Appl. No. 16/019,262, filed Jun. 26, 2018 and published as US 2019/0038044 A1 on Feb. 7, 2019 (Inventor—Kimberly Cummings).
(Continued)

Primary Examiner — Derek J Battisti
(74) Attorney, Agent, or Firm — Ballard Spahr LLP

(57) ABSTRACT

This invention relates to a safety seat system that transitions from a liner to a carrier without requiring the child or animal to be manipulated from one to the other and methods related thereto. Additionally, the disclosed safety seat system allows for free movement of the wearer's hands and arms. This abstract is intended as a scanning tool for purposes of searching in the particular art and is not intended to be limiting of the present invention.

20 Claims, 21 Drawing Sheets

(51) Int. Cl.
*B60N 2/28* (2006.01)
*A45F 3/14* (2006.01)

(52) U.S. Cl.
CPC ............ *B60N 2/2881* (2013.01); *B62B 9/108* (2013.01); *A45F 3/14* (2013.01); *A45F 2003/146* (2013.01)

(58) Field of Classification Search
USPC .......................................................... 224/275
See application file for complete search history.

(56) References Cited

U.S. PATENT DOCUMENTS

| | | | | |
|---|---|---|---|---|
| 4,724,988 | A * | 2/1988 | Tucker | A47D 13/025 224/160 |
| 5,156,436 | A * | 10/1992 | Grene | B60N 2/24 297/466 |
| 5,178,309 | A * | 1/1993 | Bicheler | A47D 13/025 224/153 |
| 5,205,451 | A | 4/1993 | Manzer | |
| 5,330,250 | A | 7/1994 | Reyes | |
| 5,625,895 | A | 5/1997 | Sovereign | |
| 5,678,739 | A | 10/1997 | Darling et al. | |
| 5,829,835 | A * | 11/1998 | Rogers | B62B 3/144 297/256.17 |
| 6,257,468 | B1 | 7/2001 | Yamazoe et al. | |
| 6,415,969 | B1 | 7/2002 | Higuchi | |
| 6,666,361 | B1 | 12/2003 | Lin | |
| 6,763,983 | B2 | 7/2004 | Norman | |
| 7,770,765 | B2 | 8/2010 | Stevens et al. | |
| 7,926,881 | B1 * | 4/2011 | Youreman | A47D 15/006 297/230.12 |
| 8,042,869 | B2 * | 10/2011 | McClintock | B62B 3/1448 297/219.12 |
| 8,550,316 | B2 | 10/2013 | Coote | |
| 9,220,352 | B2 * | 12/2015 | Frost | A47D 13/02 |
| 9,480,344 | B1 * | 11/2016 | Vialpando | A47D 13/025 |
| 10,028,592 | B1 * | 7/2018 | Ruiz | B60N 2/2845 |
| 2003/0192925 | A1 | 10/2003 | Boone | |
| 2005/0155996 | A1 | 7/2005 | Hiscocks | |
| 2005/0258202 | A1 | 11/2005 | Stevens et al. | |
| 2006/0011678 | A1 | 1/2006 | Kassai et al. | |
| 2007/0057002 | A1 | 3/2007 | Timm et al. | |
| 2008/0313812 | A1 | 12/2008 | Reeves et al. | |
| 2009/0026235 | A1 | 1/2009 | Gray | |
| 2011/0240693 | A1 | 10/2011 | Parness et al. | |
| 2014/0252814 | A1 | 9/2014 | Cohen | |
| 2014/0296045 | A1 | 10/2014 | Krstanoski-Blazeski | |
| 2015/0035331 | A1 | 2/2015 | Sparling | |
| 2015/0359356 | A1 | 12/2015 | Beekman | |
| 2015/0374139 | A1 | 12/2015 | Salazar et al. | |
| 2017/0055722 | A1 | 3/2017 | Gusky | |
| 2017/0303667 | A1 | 4/2017 | Lopez | |
| 2018/0235379 | A1 | 8/2018 | Lindeman et al. | |

FOREIGN PATENT DOCUMENTS

| | | |
|---|---|---|
| WO | WO 2017/117493 A1 | 7/2017 |
| WO | WO-2018/236412 A1 | 12/2018 |

OTHER PUBLICATIONS

International Search Report and Written Opinion dated Mar. 13, 2017 by the International Searching Authority for International Application No. PCT/US2016/069397, filed on Dec. 30, 2016 and published as WO 2017/117493 on Jul. 6, 2017 (Applicant—Kimberly Cummings) (8 Pages).

International Preliminary Report on Patentability dated Jul. 3, 2018 by the International Searching Authority for International Application No. PCT/US2016/069397, filed on Dec. 30, 2016 and published as WO 2017/117493 on Jul. 6, 2017 (Applicant—Kimberly Cummings) (7 Pages).

Non Final or Final Rejection dated Oct. 16, 2019 by the USPTO for U.S. Appl. No. 16/019,262, filed Jun. 26, 2018 and published as US 2019/0038044 A1 on Feb. 7, 2019 (Inventor—Kimberly Cummings) (20 Pages).

Final Rejection dated Feb. 7, 2020 by the USPTO for U.S. Appl. No. 16/019,262, filed Jun. 26, 2018 and published as US 2019/0038044 AI on Feb. 7, 2019 (Inventor—Kimberly Cummings) (11 Pages).

Final Office Action dated Aug. 10, 2020 with the USPTO for U.S. Appl. No. 16/019,262, filed Jun. 26, 2018 and published as US 2019/0038044 A1 on Feb. 7, 2019 (Inventor—Kimberly Cummings) (14 Pages).

Elastics/Cords, created on Jul. 8, 2009. Accessed from https://web.archive/org/web/20160513003856/http://milspecmonkey.com/customize/elasticscord.

International Search Report and Written Opinion dated Jan. 5, 2018 by the International Searching Authority for International Application No. PCT/US2017/056794, filed on Oct. 16, 2017 and published as WO 2018/236412 on Dec. 27, 2018 (Applicant—Kimberly Cummings) (10 Pages).

International Preliminary Report on Patentability dated Dec. 24, 2019 by the International Searching Authority for International Application No. PCT/US2017/056794, filed on Oct. 16, 2017 and published as WO 2018/236412 on Dec. 27, 2018 (Applicant—Kimberly Cummings) (9 Pages).

Response to Final Office Action filed on Apr. 30, 2020 with the USPTO for U.S. Appl. No. 16/019,262, filed Jun. 26, 2018 and published as US 2019/0038044 A1 on Feb. 7, 2019 (Inventor—Kimberly Cummings) (14 Pages).

Non-final Office Action dated May 22, 2020 by the USPTO for U.S. Appl. No. 16/019,262, filed Jun. 26, 2018 and published as US 2019/0038044 A1 on Feb. 7, 2019 (Inventor—Kimberly Cummings) (14 Pages).

Response to Non-Final Office Action filed on Jul. 17, 2020 with the USPTO for U.S. Appl. No. 16/019,262, filed Jun. 26, 2018 and published as US 2019/0038044 A1 on Feb. 7, 2019 (Inventor—Kimberly Cummings) (16 Pages).

* cited by examiner

INFANT CARRIER

CROSS-REFERENCE TO RELATED APPLICATIONS

This application is a U.S. National Phase Application of International Patent Application No. PCT/US2016/069397, filed Dec. 30, 2016, which claims priority to U.S. Provisional Patent Application No. 62/273,938, filed Dec. 31, 2015, and U.S. Provisional Patent Application No. 62/409,183, filed Oct. 17, 2016, all of which are incorporated herein by reference in their entireties.

BACKGROUND

Infant care, particularly for a newborn infant, is a 24-hour commitment requiring constant vigilance by the caregiver. This care often requires the caregiver to transport and carry the infant with them, either by hand, in a stroller, or in the car, as they engage in daily activities such as shopping and housekeeping. To accommodate these needs, a variety of devices have been developed to transport an infant from place to place. These include car seats, backpack-like carriers, frontal carriers, infant slings, and infant wraps. However, none of these devices can accommodate a child both in the car and when traveling by hand (i.e., carrying the child). Specifically, the child must be taken out of the car seat and placed into a carrier and vice versa throughout the day.

In order to overcome this problem, infant car seat/carrier combinations have been developed (see e.g., U.S. Pat. No. 6,863,286), which have a contoured shell with a carrying handle mounted to the shell. In this way, the caregiver can remove the shell from the base of the car seat and transport the child using the handle to carry the shell like a basket. These shells, however, are heavy and bulky, making them difficult to carry about. Indeed, the weight of carrying the child in the shell only increases as the infant grows. This can be particularly trying for new mothers who are told to refrain from heavy lifting after giving birth. Moreover, the need to carry the shell by hand limits the caregiver from participating in routine activities that involve the use of their arms, such as shopping and housekeeping.

Accordingly, there remains a need for a lightweight transport system that transitions from a car seat to a carrier and that allows for free movement of the caregiver's hands and arms. These needs and others are met by the present invention.

SUMMARY

In accordance with the purpose(s) of the invention, as embodied and broadly described herein, the invention, in one aspect, relates to infant carriers and methods of making same.

Disclosed are safety seat systems comprising: (a) a safety seat liner dimensioned to support a child in a car seat; and (b) a harness dimensioned to fit an adult wearer, wherein the liner and the harness each comprise multiple opposite end fasteners configured to reversibly attach the liner to the harness.

Also disclosed are safety seat liners comprising: (a) a head support member comprising a pair of first attachment members; (b) a body support member connected to the head support member, wherein the body support member comprises a surface and a bottom edge; (c) a pair of side members connected to the body support member, wherein each side member comprises a second attachment member, wherein the safety seat liner is dimensioned to support a child in a car seat; and wherein the safety seat liner is configured to reversibly attach to a harness dimensioned to fit an adult wearer.

Also disclosed are safety seat systems comprising a safety seat liner dimensioned to support a child in a car seat, the liner comprising: (a) a surface that defines: (i) a top edge, wherein the top edge defines a head support member; and (ii) an inner edge, wherein the inner edge defines a hole; and (b) a pair of side members connected to the surface, wherein each side member is configured to be tied together when in operable condition.

Also disclosed are harnesses comprising: (a) a pair of straps configured to encircle a wearer's shoulders, wherein each strap comprises a first end, a second end, and a center portion comprising a third attachment member; and (b) a circular member configured to encircle a wearer's waist, wherein the circular member comprises an outer surface, an inner surface, and a top edge, and wherein the circular member is connected to the first end of each strap, wherein the harness is dimensioned to fit an adult wearer; and wherein the harness is configured to reversibly attach to a safety seat liner dimensioned to support a child in a car seat.

Also disclosed are harnesses comprising: (a) a pair of straps configured to encircle a wearer's shoulders, wherein each strap comprises a first end, a second end, and a center portion comprising a third attachment member and a fourth attachment member; and (b) a back support member connected to the first end and the second end of each strap, wherein the harness is dimensioned to fit an adult wearer; and wherein the harness is configured to reversibly attach to a safety seat liner dimensioned to support a child in a car seat.

Also disclosed are methods of making a safety seat system, the method comprising attaching a safety seat liner dimensioned to support a child in a car seat and a harness dimensioned to fit an adult wearer, wherein the liner and the harness each comprise multiple opposite end fasteners configured to reversibly attach the liner and the harness to each other, thereby making a safety seat system.

Also disclosed are methods of supporting a mammal, the method comprising supporting the mammal in a safety seat system comprising: (a) a safety seat liner dimensioned to support a child in a car seat; and (b) a harness dimensioned to fit an adult wearer, wherein the liner and the harness each comprise multiple opposite end fasteners configured to reversibly attach the liner and the harness to each other, thereby supporting the mammal.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

Figure 1:
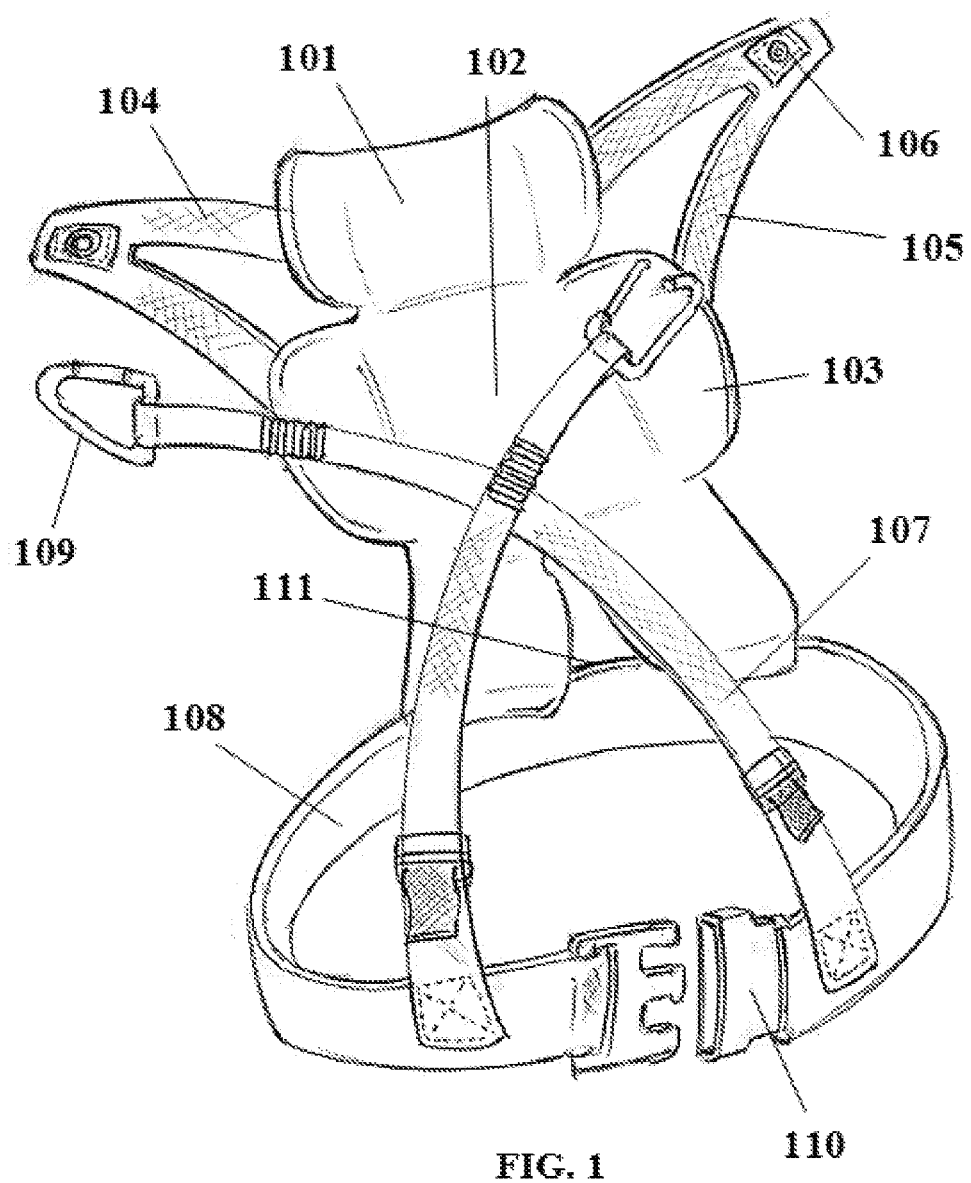
FIG. 1 shows a representative image of a safety seat system having a safety seat liner connected to the belt of the harness.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples and Figures included herein.

While aspects of the present invention can be described and claimed in a particular statutory class, such as the article of manufacture statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a liner," "a harness," or "a car seat" includes mixtures of two or more such liners, harnesses, or car seats, and the like.

As used herein, the terms "optional" or "optionally" means that the subsequently described event or circumstance can or cannot occur, and that the description includes instances where said event or circumstance occurs and instances where it does not.

B. Safety Seat Systems

In one aspect, disclosed are safety seat systems comprising: (a) a safety seat liner dimensioned to support a child in a car seat; and (b) a harness dimensioned to fit an adult wearer, wherein the liner and the harness each comprise multiple opposite end fasteners configured to reversibly attach the liner to the harness. In a further aspect, disclosed are safety seat systems comprising: (a) a safety seat liner dimensioned to support a child in a car seat; and (b) a harness dimensioned to fit an adult wearer, wherein the liner and the harness each comprise at least one opposite end fastener configured to reversibly attach the liner to the harness.

In one aspect, disclosed are safety seat systems comprising a safety seat liner dimensioned to support a child in a car seat, the liner comprising: (a) a surface that defines: (i) a top edge, wherein the top edge defines a head support member; and (ii) an inner edge, wherein the inner edge defines a hole; and (b) a pair of side members connected to the surface, wherein each side member is configured to be tied together when in operable condition.

In one aspect, disclosed are safety seat systems comprising: (a) a head support member comprising a first attachment member; (b) a body support member connected to the head support member, wherein the body support member comprises a surface that defines: (i) an inner edge, wherein the inner edge defines a hole; and (ii) a bottom edge, wherein the bottom edge comprises a second attachment member configured for engagement with the first attachment member, or wherein each of the first and second attachment members together comprise a strap; and (c) a pair of side members connected to the body support member, wherein the safety seat system is dimensioned to support a child in a car seat; and wherein the safety seat system is dimensioned to reversibly fit an adult wearer.

Thus, in various aspects, the safety seat system allows a wearer to securely hold a mammal as in, for example, a "sling." Here, the strap, when present, may allow a wearer to carry a mammal over-the-shoulder, across the wearer's body. Thus, the strap may be worn over one shoulder to suspend the head support member and the body support member in close proximity to the wearer's hack or torso. Alternatively, the first and second attachment members may be engaged near one shoulder, thereby suspending the head support member and body support member in close proximity as detailed above.

In one aspect, disclosed are safety seat systems comprising a safety seat liner dimensioned to support a child in a car seat, the liner comprising: (a) a surface that defines: (i) a top edge, wherein the top edge defines a head support member; (ii) a first inner edge; (iii) a second inner edge; and (iv) a third inner edge, wherein each of the first, second, and third inner edges define a hole; and (b) sufficient material to be tied around a wearer's waist when in operable condition.

Thus, in various aspects, the safety seat system allows a wearer to insert each arm through a hole in the body support member. Thus, the safety seat system will appear as "sleeves" on the wearer when in use. The body support member further comprises sufficient material to tie around the wearer's waist, thereby securing the system to the wearer's torso.

In one aspect, disclosed are safety seat systems comprising a safety seat liner dimensioned to support a child in a car seat, the liner comprising: (a) a surface that defines: (i) a top edge, wherein the top edge defines a head support member; and (ii) an inner edge, wherein the inner edge define a hole; (b) a pair of side members connected to the surface, wherein each side member is configured to be tied around a wearer's torso when in operable condition; and (c) sufficient material to be tied around a wearer's waist when in operable condition.

The disclosed safety seat system is designed to serve two purposes. Firstly, the safety seat liner provides an insert to support a child in a car seat, while allowing the child to be securely fastened into the car seat. It is therefore understood that the straps of the car seat are accessible and able to be manipulated around and/or through the safety seat liner. Secondly, the safety seat system functions as a carrier, allowing a wearer to securely tote a child or animal around and enabling free movement of the wearer's arms and upper body. In this way, the safety seat system transitions from a liner to a carrier without requiring the child or animal to be manipulated from one to the other. Thus, a child who falls asleep in their car seat need not be disturbed upon arrival at the destination. Rather, the adult can simply unfasten the child's seat belt, attach the liner to the harness, and pick the sleeping child up. The disclosed safety seat system functions similarly when in use in a stroller.

Referring to FIG. 1, for example, the safety seat system can comprise a safety seat liner dimensioned to support a child in a car seat and a harness dimensioned to fit an adult wearer. As shown here, the safety seat liner comprises a head support member 101, a body support member 102, and a pair of side edges 103. The head support member 101, the body support member 102, and each side edge 103 together are a single component. The head support member 101 comprises a pair of first attachment members 104 and each side member comprises a pair of second attachment members 105. A first attachment member 104 together with a second attachment member 105 comprises a loop. As shown here, the loop can comprise a ring 106, as shown in FIG. 1, but other attachment members such as, for example, a clip and a snap, are also envisioned. Alternatively, the loop can function as an attachment member by itself, and an additional attachment member on the loop need not be present. The loops allow for the shoulder straps of a car seat to be accessed and manipulated. The harness comprises a pair of straps 107 and a belt 108. Each strap 107 comprises a clip 109 configured for engagement with a ring 106. The straps 107 are connected to the belt 108 via a seam. The belt 108 is also connected to the body support member 102 via a seam. The belt 108 comprises a clip 110 to securely fasten the belt 108 around the wearer's waist or hips. As shown here, the surface of the body support member 102 in combination with the top edge of the belt 108 defines an inner edge 111, which defines a hole through which the seatbelt of a car seat can be accessed.

Figure 7A:
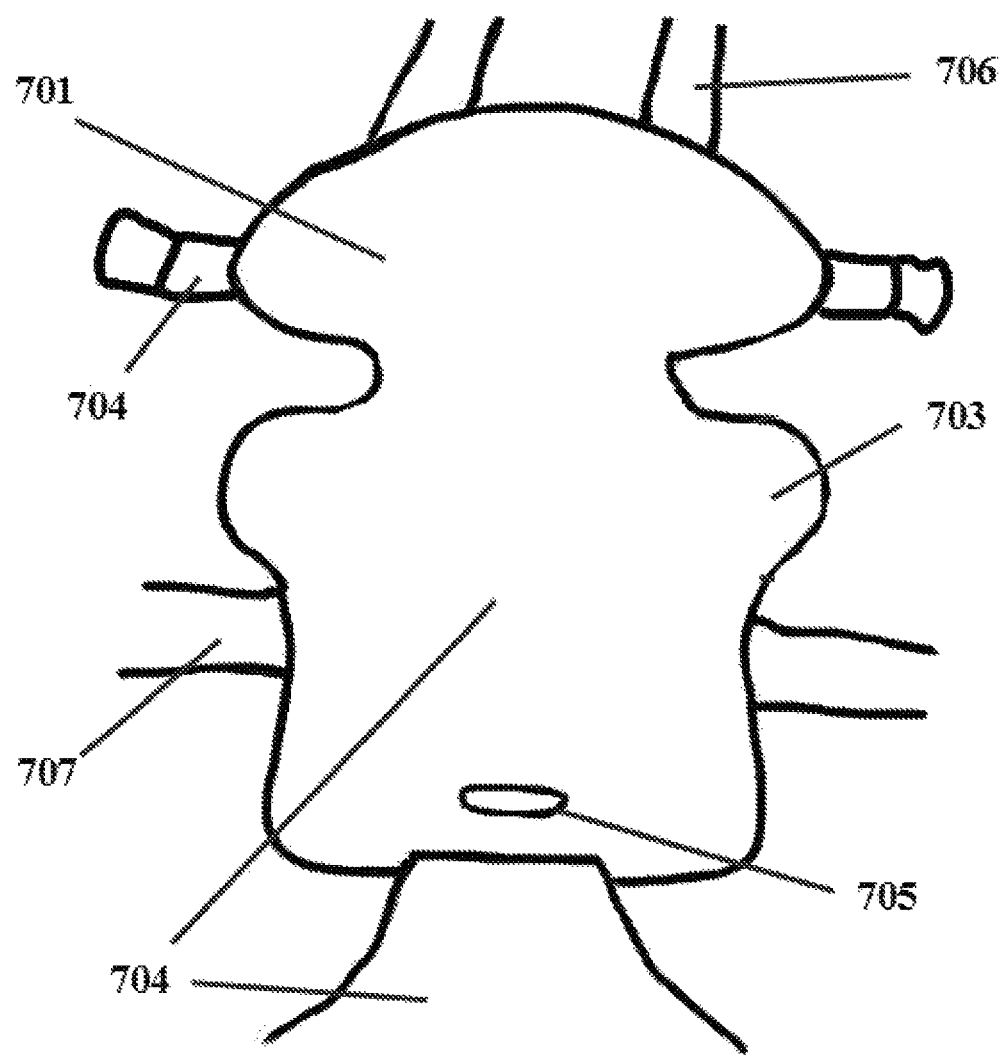
FIG. 7A-C show representative images of the interior of a safety seat system having a pair of female components of a side release buckle for attaching the body support member to the side members.
Figure 7B:
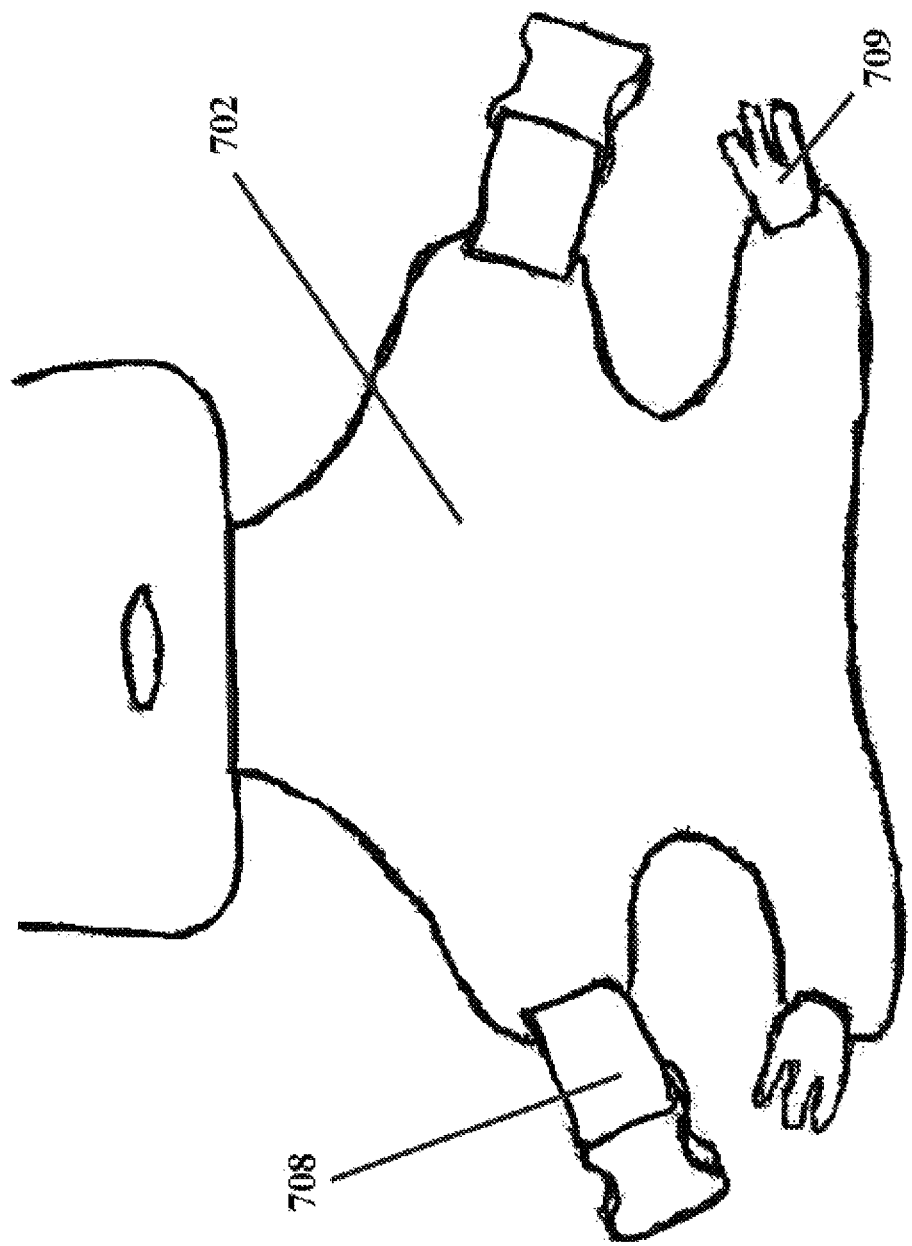
Figure 7C:
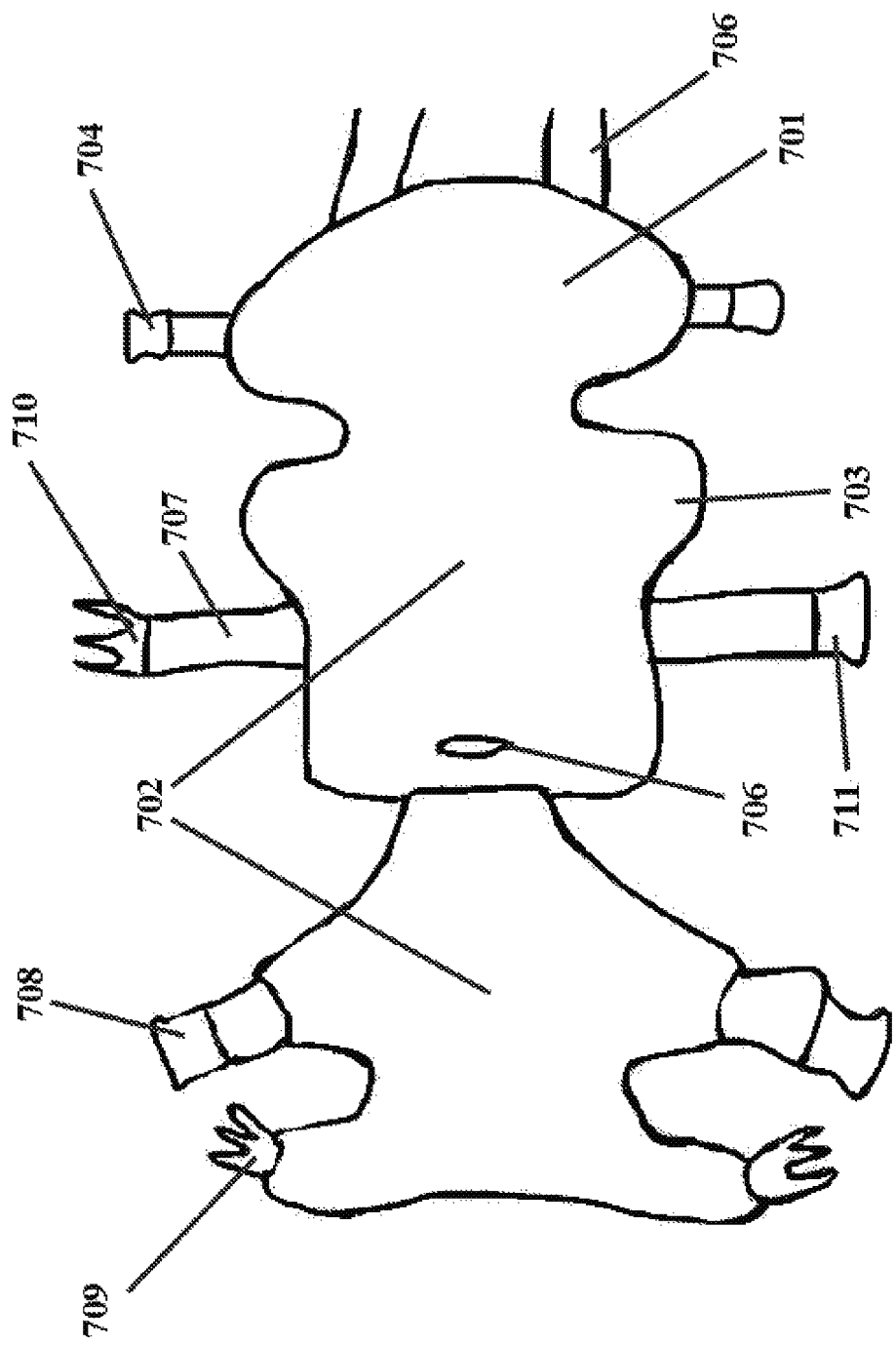

Referring to FIG. 7A-C, the interior of a safety seat system comprising a safety seat liner dimensioned to support a child in a car seat and a harness dimensioned to fit an adult wearer is shown. The safety seat liner comprises a head support member 701, a body support member 702, and a pair of side edges 703. The head support member 701 comprises a pair of first attachment members 704. As shown here, first attachment members 704 can comprise the female component of a side release buckle but other attachment members such as, for example, a clip and a snap, are also envisioned. The surface of the body support member 702 defines an inner edge 705, which defines a hole through which the seatbelt of a car seat can be accessed. The harness comprises a pair of straps 706 and a belt 707. Straps 706 can be configured to encircle, for example, a wearer's head. Belt 707 comprises a female component of a side release buckle 710 and a male component of a safety release buckle 711, which may be used to securely fasten the belt 707 around the wearer's waist or hips. Other means of attaching the belt such as, for example, via a tie or a buckle, are also envisioned.

As shown in FIG. 7B and FIG. 7C, body support member 702 may comprise a pair of second attachment members 708, Second attachment members 708 can be configured for engagement with a pair of attachment members located on, for example, straps 706. Body support member 702 may further comprise an additional pair of attachment members 709. As shown here, additional attachment members 709 can comprise the male component of a side release buckle but other attachment members such as, for example, a clip and a snap, are also envisioned. In this way, attachment members 709 may be configured for engagement with the first attachment members 704.

Figure 8A:
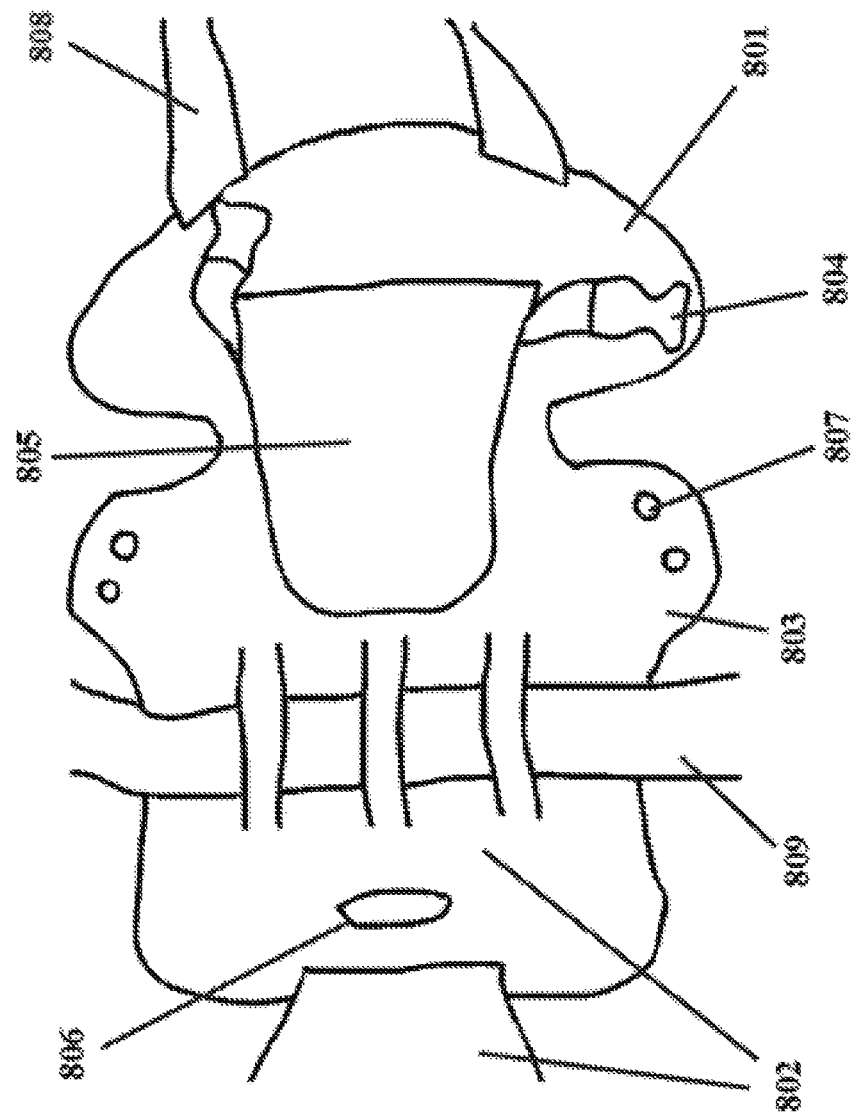
FIG. 8A-C show representative images of the exterior of a safety seat system having a multiple pairs of snaps for attaching the body support member to the side members.
Figure 8B:
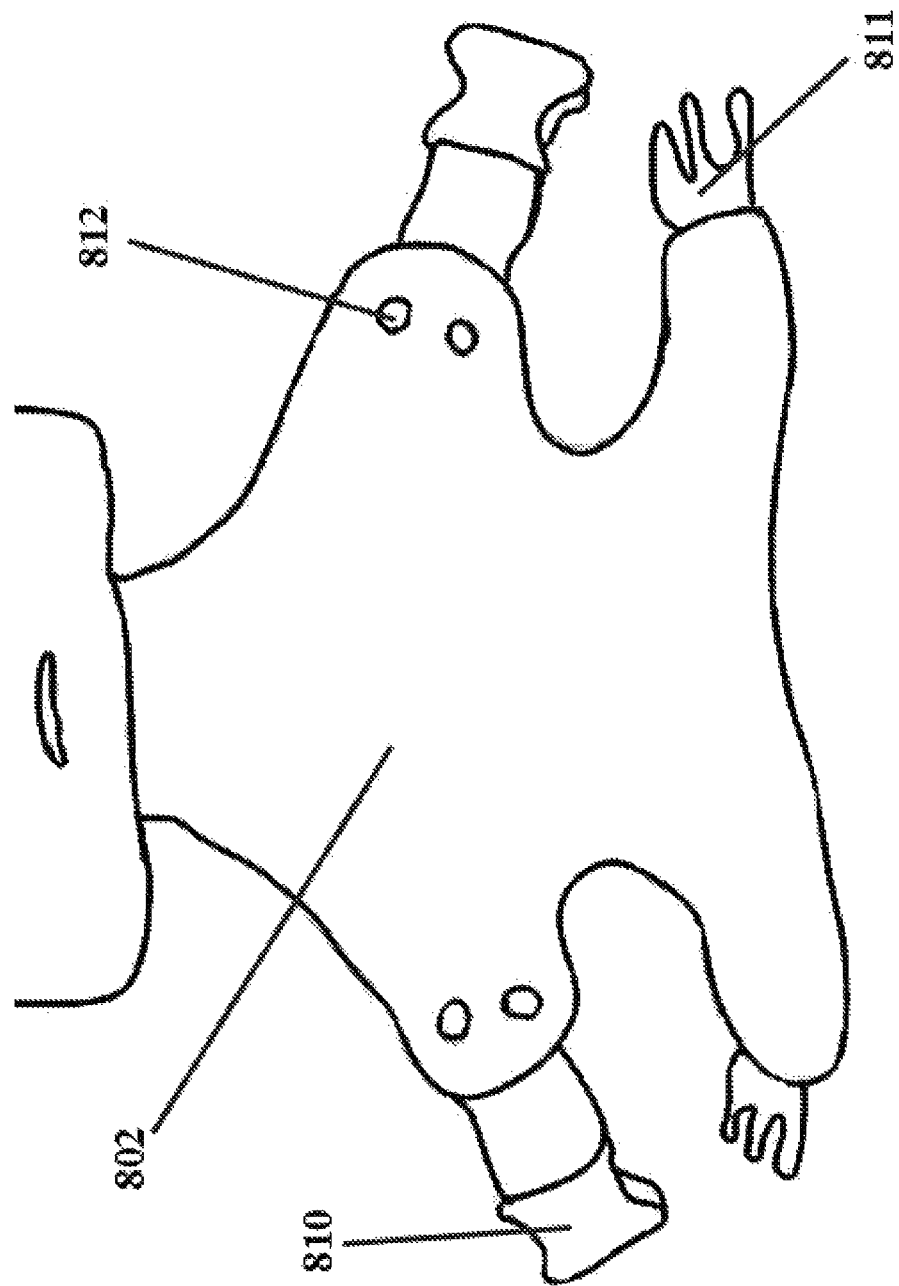
Figure 8C:
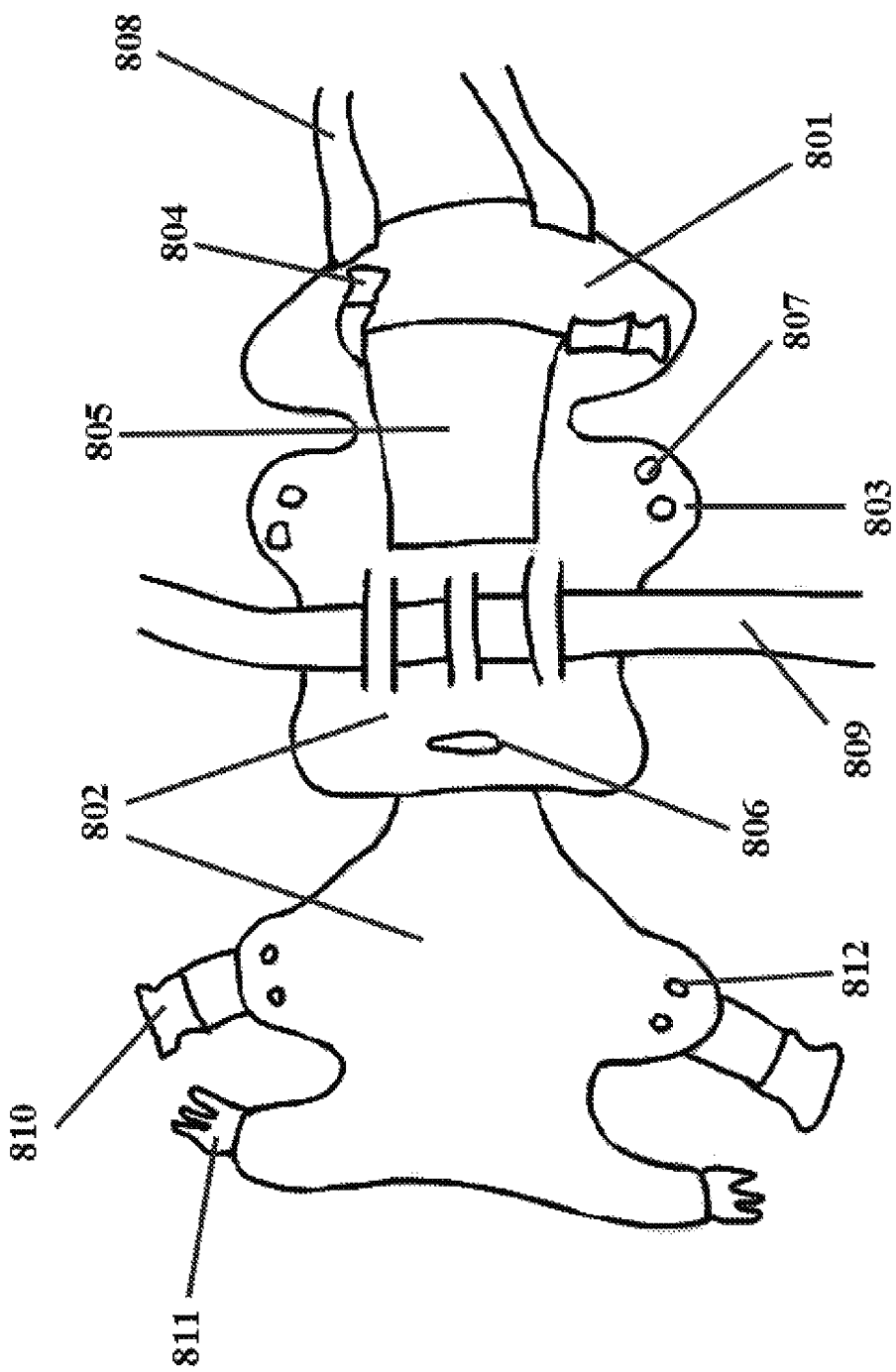

Referring to FIG. 8A-C, for example, the exterior of a safety seat system comprising a safety seat liner dimensioned to support a child in a car seat and a harness dimensioned to fit an adult wearer is shown. The safety seat liner comprises a head support member 801, a body support member 802, and a pair of side edges 803. The head support member 801 comprises a pair of first attachment members 804. As shown here, first attachment members 804 can comprise the female component of a side release buckle but other attachment members such as, for example, a clip and a snap, are also envisioned. The head support member 801 in combination with the body support member 802 can comprise a pocket 805, which may be used to store items such as, for example, a set of keys, bottles, diapers, wipes, or a phone. The surface of the body support member 802 defines an inner edge 806, which defines a hole through which the seatbelt of a car seat can be accessed. Side edges 803 can comprise one or more pairs of attachment members 807. As shown here, attachment members 807 can comprise the male component of a snap but other attachment members such as, for example, the female component of a snap, a button, a button hole, and a clip, are also envisioned. The harness comprises a pair of straps 808 and a belt 809, Straps 808 can be configured to encircle, for example, a wearer's head.

As shown in FIG. 8B and FIG. 8C, body support member 802 may comprise a pair of second attachment members 810. Second attachment members 810 can be configured for engagement with a pair of attachment members located on, for example, straps 808. Body support member 802 may further comprise an additional pair of attachment members 811. As shown here, additional attachment members 811 can comprise the male component of a side release buckle but other attachment members such as, for example, a clip and a snap, are also envisioned. In this way, attachment members 811 may be configured for engagement with the first attachment members 804. Further, body support member 802 may comprise one or more additional pairs of attachment members 812. As shown here, attachment members 812 can comprise the female component of a snap but other attachment members such as, for example, the female component of a snap, a button, a button hole, and a clip, are also envisioned. In this way, attachment members 812 may be configured for engagement with the attachment members 807.

Figure 10:
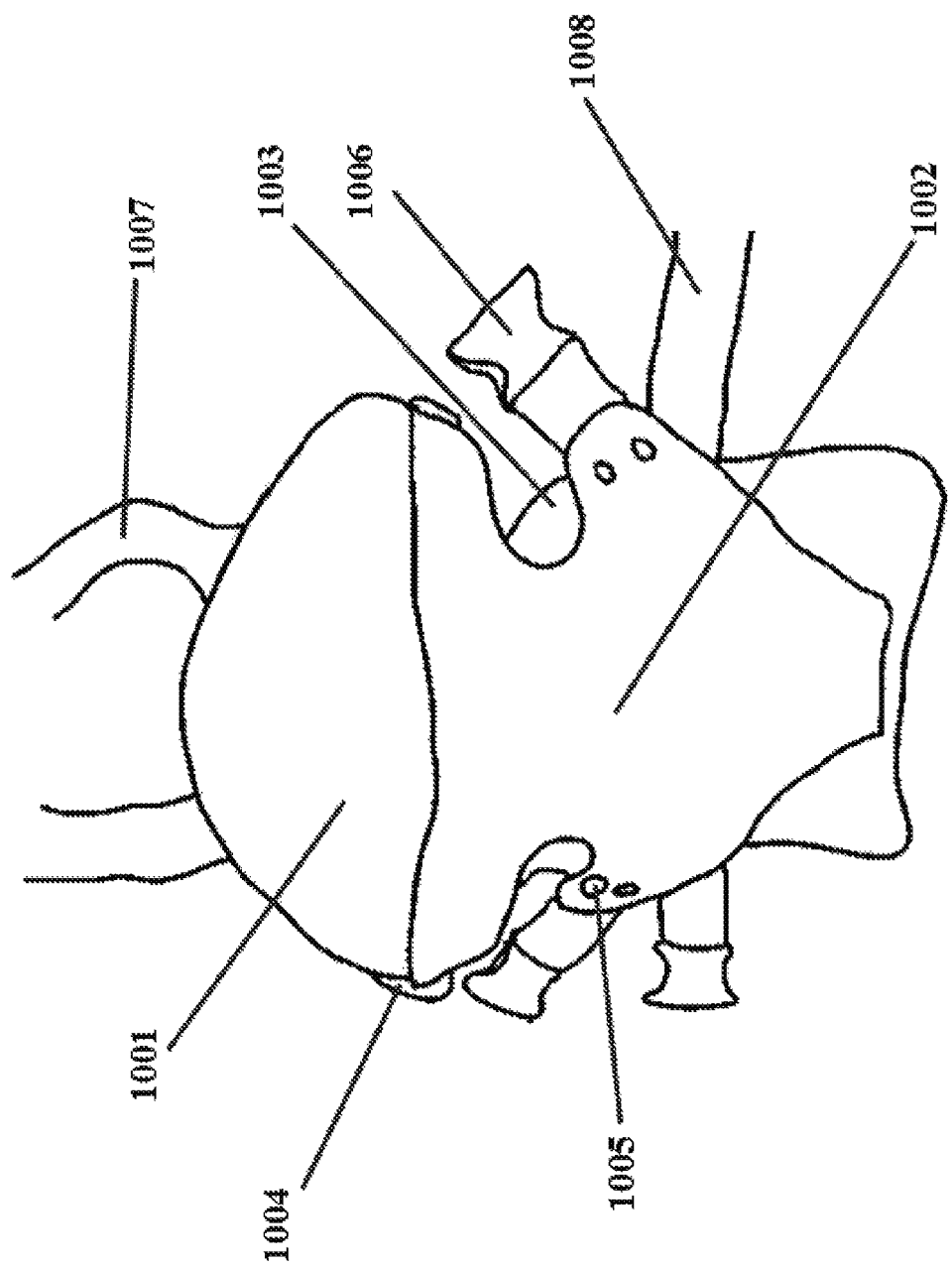
FIG. 10 shows a representative image of a safety seat system with the body support member attached to the side release members via a pair of side release buckles.

Referring to FIG. 10, for example, a safety seat system configured as in operable condition is shown. The safety seat liner comprises a head support member 1001, a body support member 1002, and a pair of side edges 1001 As shown here, head support member 1001 is attached to body support member 1002 via attachment members 1004. It is noted that 1004 represents an attachment member on head support member 1001 together with an attachment member on body support 1002 in an attached conformation. As shown here, body support member 1002 is attached to side edges 1003 via attachment members 1005. It is noted that 1005 represents an attachment member on body support member 1002 together with an attachment member on side edge 1003 in an attached conformation. Body support member 1002 further comprises a pair of attachment members 1006. Attachment members 1006 can be configured for engagement with a pair of attachment members located on, for example, straps 1007. As shown here, attachment members 1006 can comprise the female component of a side release buckle but other attachment members such as, for example, a clip and a snap, are also envisioned. The harness comprises a pair of straps 1007 and a belt 1008. Straps 1007 can be configured to encircle, for example, a wearer's head.

Figure 11A:
FIG. 11A and FIG. 11B show representative images of a safety seat system in use from the side (11A) and back (11B).
Figure 11B:
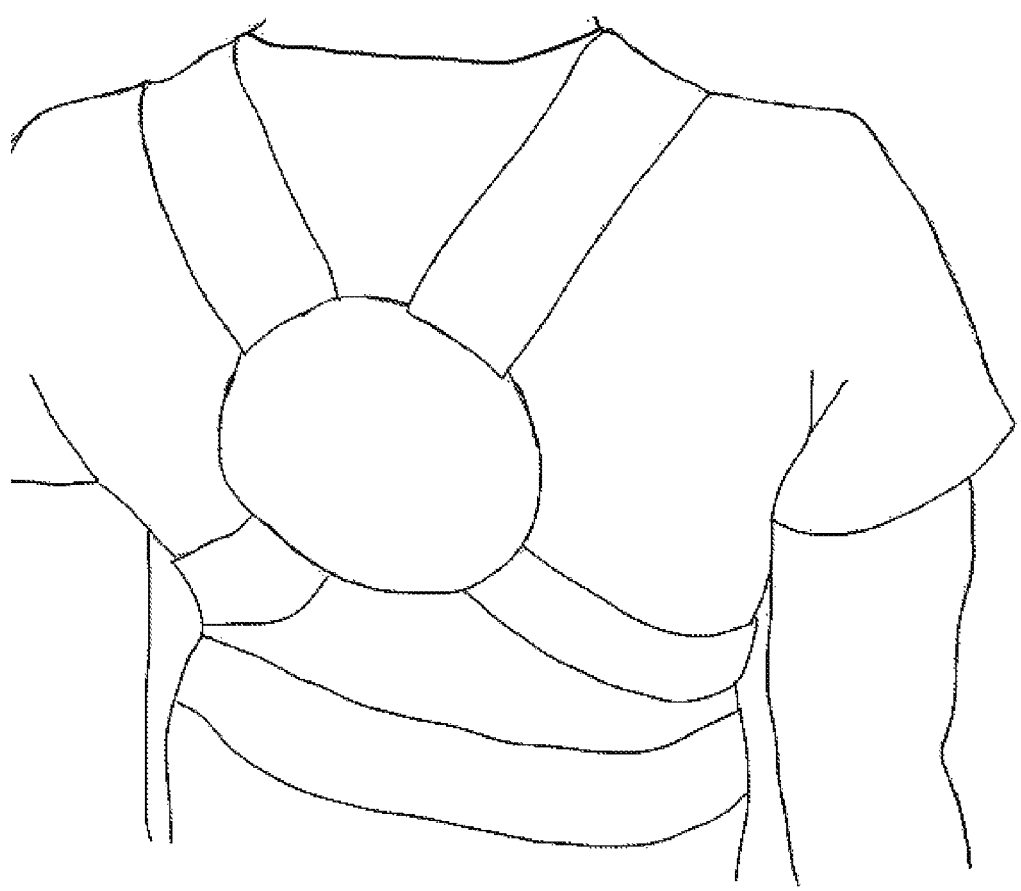

Referring to FIG. 11A and FIG. 11B, representative images of a safety seat system configured as in operable conditions from the side (FIG. 11A) and back (FIG. 11B) are shown.

Figure 12:
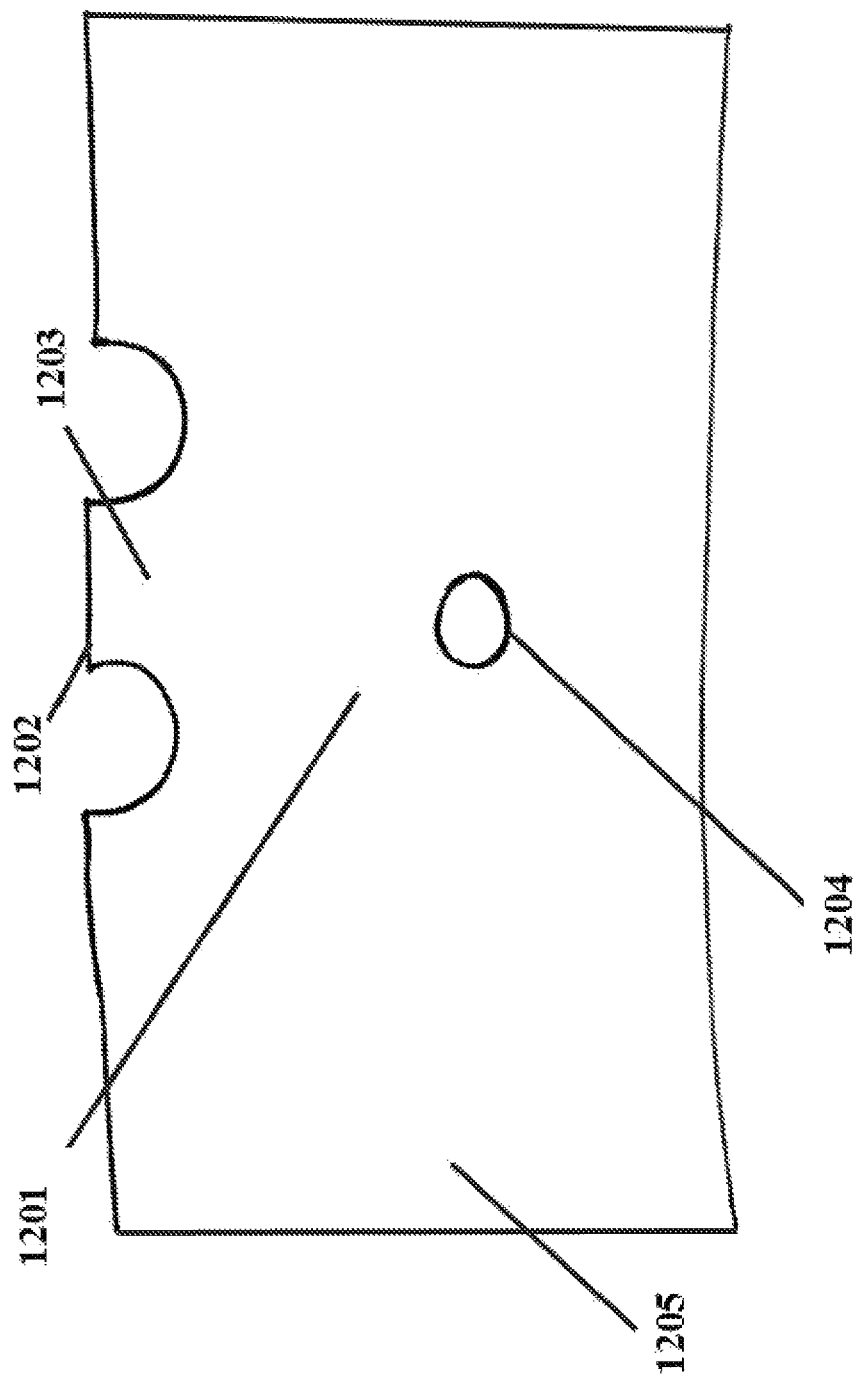
FIG. 12 shows a representative image of a safety seat system having a pair of side members capable of being tied together when in operable condition.

Referring to FIG. 12, for example, a safety seat system comprising a safety seat liner dimensioned to support a child in a car seat is shown. The safety seat liner comprises a surface 1201 that defines a top edge 1202. Top edge 1202 defines head support member 1203. This provides a space on both sides of the head support member through which the shoulder straps of a car seat harness can be accessed. Surface 1201 also defines inner edge 1204, which defines a hole through which the seatbelt of a car seat can be accessed. The safety seat liner also comprises a pair of side members 1205. Side members 1205 must at least be long enough to encircle a wearer's waist and tie together, thereby securing the safety seat liner onto the wearer when in operable condition.

Figure 13:
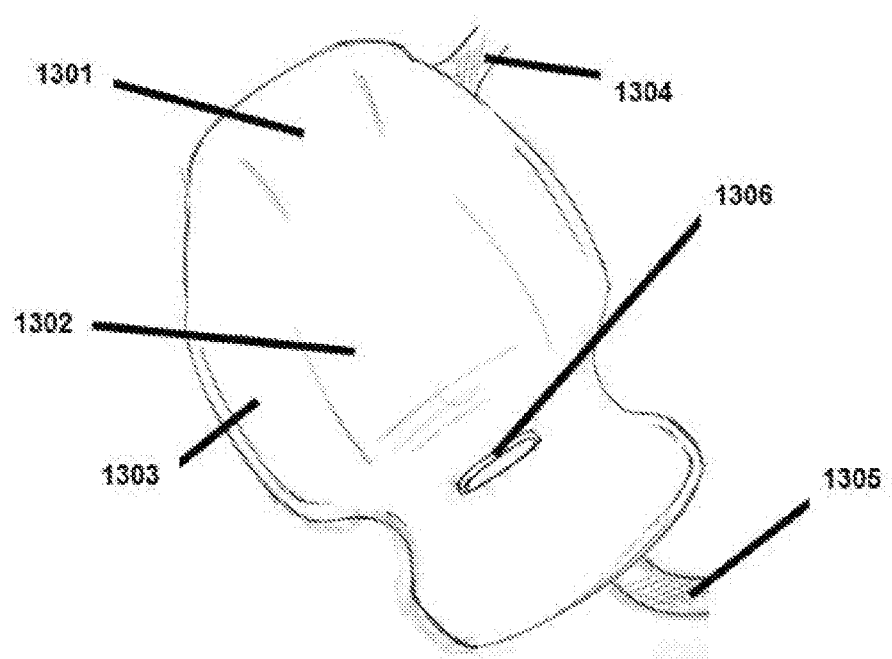
FIG. 13 shows a representative image of a safety seat system having a single strap.

Referring to FIG. 13, for example, the safety seat system comprises a head support member 1301, a body support member 1302, and a pair of side members 1303. As shown here, the head support member 1301, the body support member 1302, and each side member 1303 are a single component. The head support member 1301 comprises a first attachment member 1304 and the, body support member 1302 comprises a second attachment member 1305. As shown here, the first and second attachment members together comprise a strap. Additionally, as shown here, the surface of the body support member 1302 defines an inner edge 1306, which defines a hole through which the seatbelt of a car seat can be accessed.

Figure 14:
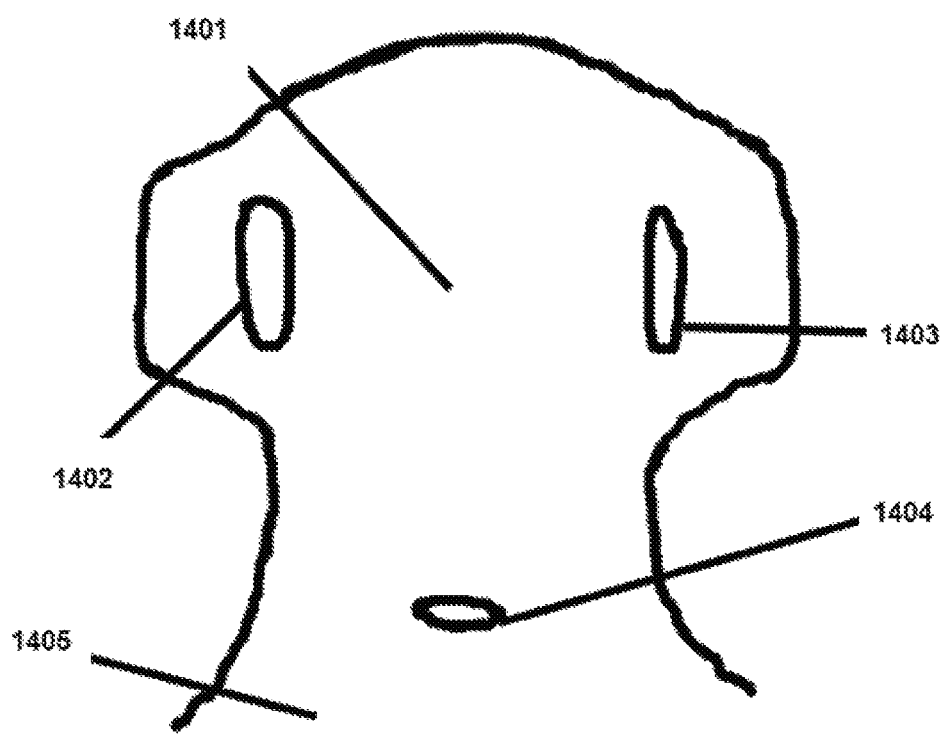
FIG. 14 shows a representative image of a safety seat system having armholes.

Referring to FIG. 14, for example, the safety seat system comprises a safety seat liner dimensioned to support a child in a car seat. As shown here, the safety seat liner comprises a surface 1401 comprising a first inner edge 1402, a second inner edge 1403, and a third inner edge 1404. Each of the first and second inner edges defines a hole through which a wearer can insert an arm, thereby resulting in the appearance of "sleeves" on the wearer when in use. The third inner edge 1404 defines a hole through which the seatbelt of a carseat can be accessed. The surface further comprises sufficient material 1405 to encircle and tie around, for example, a wearer's waist.

Figure 15:
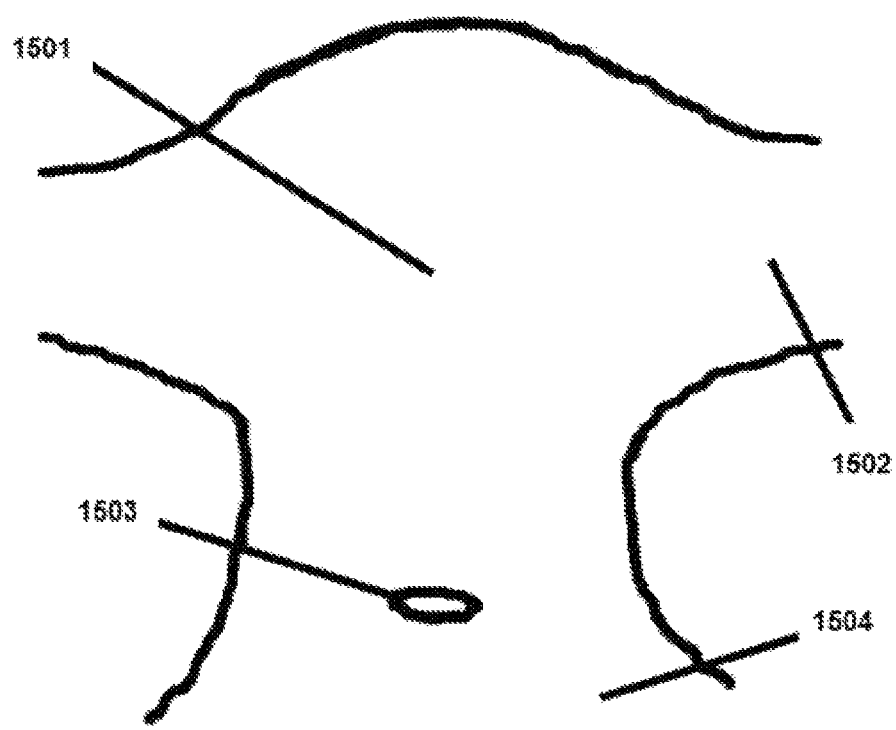
FIG. 15 shows a representative image of a safety seat system having a pair of side members capable of being tied together when in operable condition and sufficient excess material to be tied around, for example, a wearer's waist.

Referring to FIG. 15, for example, the safety seat system comprises a safety seat liner dimensioned to support a child in a car seat. As shown here, the safety seat liner comprises a surface 1501 and a pair of side members 1502. The surface comprises an inner edge 1503, which defines a hole through which the seatbelt of a carseat can be accessed. The surface further comprises sufficient material 1504 to encircle and tie around, for example, a wearer's waist. As shown here, each side member 1502 also comprises sufficient material to be tied around a wearer's torso or arm, thereby resulting in the appearance of "sleeves."

Figure 16:
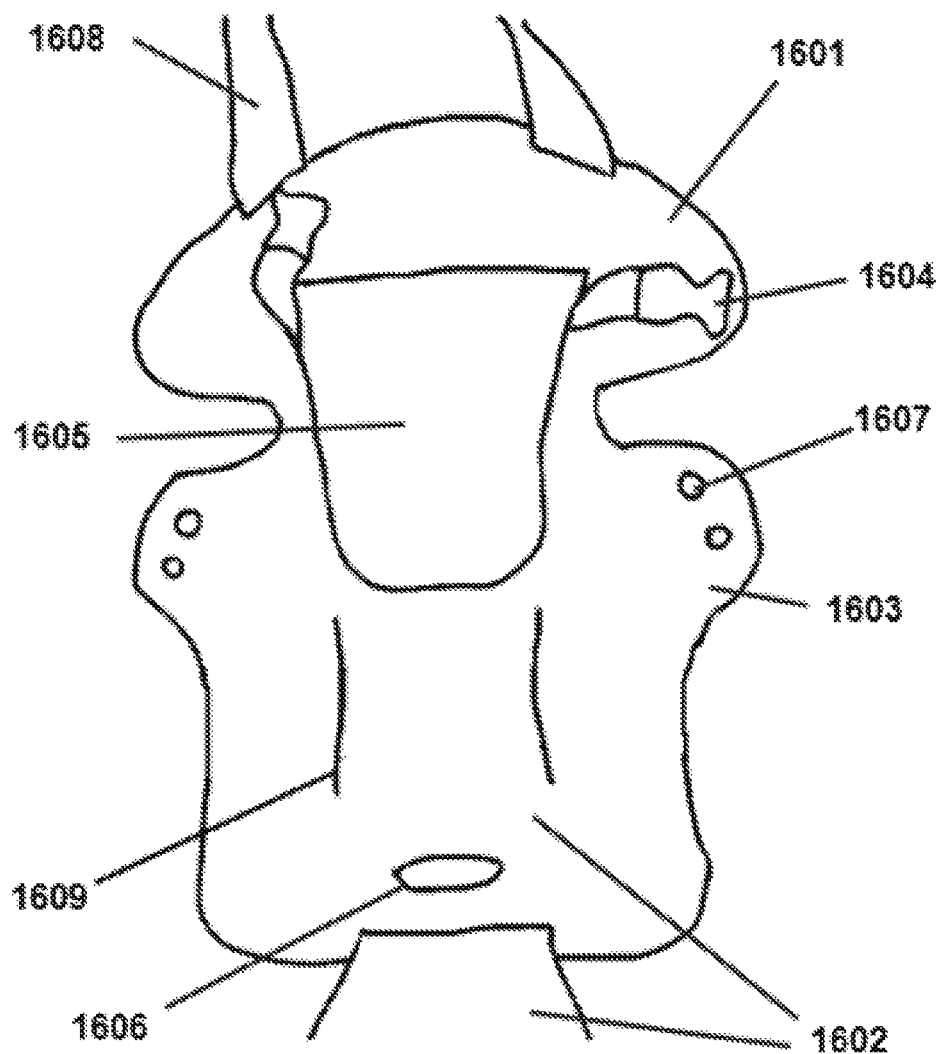
FIG. 16 shows a representative image of a safety seat system having vertical stitches on the exterior.

Referring to FIG. 16, for example, the exterior of a safety seat system comprising a safety seat liner dimensioned to support a child in a car seat and a harness dimensioned to fit an adult wearer is shown. The safety seat liner comprises a head support member 1601, a body support member 1602, and a pair of side edges 1603. The head support member 1601 comprises a pair of first attachment members 1604. As shown here, first attachment members 1604 can comprise the female component of a side release buckle but other attachment members such as, for example, a clip and a snap, are also envisioned. The head support member 1601 in combination with the body support member 1602 can comprise a pocket 1605, which may be used to store items such as, for example, a set of keys, bottles, diapers, wipes, or a phone. The surface of the body support member 1602 defines an inner edge 1606, which defines a hole through which the seatbelt of a car seat can be accessed. Side edges 1603 can comprise one or more pairs of attachment members 1607. As shown here, attachment members 1607 can comprise the male component of a snap but other attachment members such as, for example, the female component of a snap, a button, a button hole, and a clip, are also envisioned.

The harness comprises a pair of straps 1608. Straps 1608 can be configured to encircle, for example, a wearer's head. The body support member 1602 further comprises two vertical stitches 1609 to provide comfortable seating for the child.

In a further aspect, the liner and the harness are connected. In a still further aspect, connected is via a seam. In yet a further aspect, connected is via engagement of at least one pair of opposite end fasteners.

In a further aspect, the safety seat system further comprises a child's car seat.

In a further aspect, the safety seat system further comprises a stroller.

In a further aspect, the safety seat system is dimensioned to support a child in one or more of a child's car seat, a stroller, a high chair, a bouncy seat, a swing, and a changing table. In a still further aspect, the safety seat system is dimensioned to support a child in one or more of a child's car seat and a stroller. In yet a further aspect, the safety seat system is dimensioned to support a child in a child's car seat. In an even further aspect, the safety seat system functions as both a carrier and a car seat liner. In a still further aspect, the safety seat system functions as both a carrier and a changing pad.

In a further aspect, the safety seat system is dimensioned so that in operable condition the safety seat liner is on the front of the wearer. In a still further aspect, the safety seat system is dimensioned so that in operable condition the safety seat liner is on the front of the wearer and the mammal faces the wearer. In yet a further aspect, the safety seat system is dimensioned so that in operable condition the safety seat liner is on the front of the wearer and the mammal opposes the wearer.

In a further aspect, the safety seat system is dimensioned so that in operable condition the safety seat liner is on the back of the wearer. In a still further aspect, the safety seat system is dimensioned so that in operable condition the safety seat liner is on the back of the wearer and the mammal faces the wearer. In yet a further aspect, the safety seat system is dimensioned so that in operable condition the safety seat liner is on the back of the wearer and the mammal opposes the wearer.

In various aspects, the safety seat system further comprises a sensor. The sensor may be useful in, for example, alerting a person to the location of the safety seat system and thus, to the location of a mammal in the safety seat system. In this way, a person would be able to track the location of the mammal and/or be alerted to the location of the mammal. In a further aspect, the sensor is a tracker. Examples of trackers include, but are not limited to, Tile, TrakR Bravo, Bluetooth, and GPS.

In various aspects, additional elements may be incorporated into the safety seat system. Examples of additional elements include, but are not limited to, mesh, padding, plastic, and foam. The incorporation of padding, for example, may provide the wearer and/or the mammal with additional comfort.

In various aspects, the safety seat system comprises attachment members. Examples of attachment members include, but are not limited to, rings, clips, carabiners, swivel-hooks, a snaps, a snap-hooks, a bulldog clips, a trigger hooks, hooks, and straps or some other tiable member. In a further aspect, an attachment member is selected from rings, clips, carabiners, swivel-hooks, a snaps, a snap-hooks, a bulldog clips, a trigger hooks, and hooks.

In various aspects, accessories may be clipped, hooked, or otherwise connected to the safety seat system. Examples of accessories include, but are not limited to, toys and pacifiers.

In various aspects, the safety seat system has an ergonomic design to improve the comfort of the child and/or the wearer. This can be achieved by, for example, selecting the width of the body support member such that when in operation the child's bottom is lower than the child's knees. Alternatively, this can be achieved by having one or more vertical stitches on the exterior of the system that contour to the child's lower back and/or bottom (see, e.g., FIG. 16).

1. Safety Seat Liner

In one aspect, the disclosed safety seat system comprises a safety seat liner dimensioned to support a child in a car seat.

In one aspect, the disclosed safety seat system comprises a safety seat liner dimensioned to support a child in a stroller.

In one aspect, disclosed are safety seat liners comprising: (a) a head support member comprising a pair of first attachment members; (b) a body support member connected to the head support member, wherein the body support member comprises a surface and a bottom edge; (c) a pair of side members connected to the body support member, wherein each side member comprises a second attachment member, wherein the safety seat liner is dimensioned to support a child in a car seat; and wherein the safety seat liner is configured to reversibly attach to a harness dimensioned to fit an adult wearer.

In various aspects, the safety seat liner comprises excess material instead of attachment members. In a further aspect, the safety seat liner comprises excess material in addition to attachment members. The excess material may be tied together and in this way hold the mammal in the safety seat liner. Alternatively, the excess material may be tied together and hold the safety seat liner on the wearer. In this way, the excess material may function as a harness. In various aspects, the attachment members are straps or fabric that ties.

Figure 2:
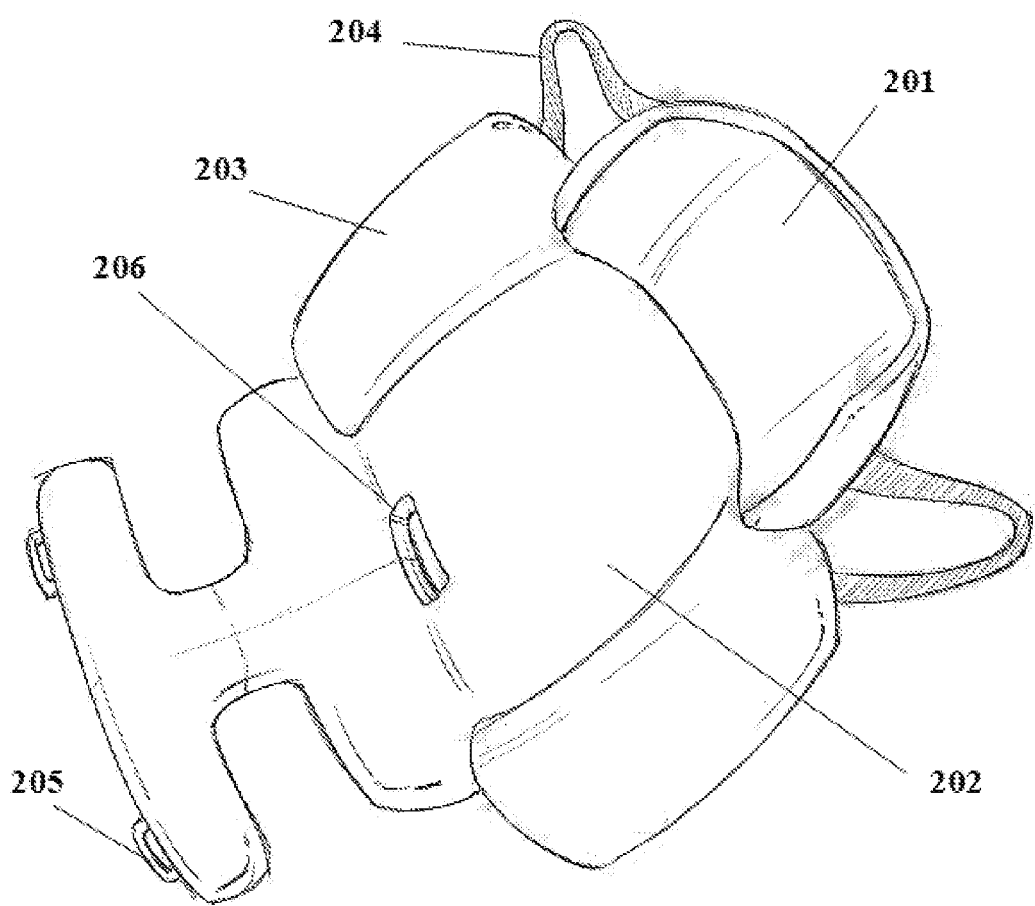
FIG. 2 shows a representative image of a safety seat liner having both a pair of loops and a pair of clips for attaching the liner to a harness.

Referring to FIG. 2, for example, the safety seat liner comprises a head support member 201, a body support member 202, and a pair of side members 203. As shown here, the head support member 201, the body support member 202, and each side member 203 are different components. The head support member 201 comprises a pair of first attachment members and each side member comprises a pair of second attachment members that together comprise a loop 204. The loops 204 allow for the shoulder straps of a car seat to be accessed and manipulated, while also attaching to a harness. The body support member 202 further comprises a pair of hooks 205. In this way, both the loops and the hooks can reversibly attach the liner to a harness (see e.g., FIG. 4). As shown here, the surface of the body support member 102 defines an inner edge 206, which defines a hole through which the seatbelt of a car seat can be accessed.

Figure 3:
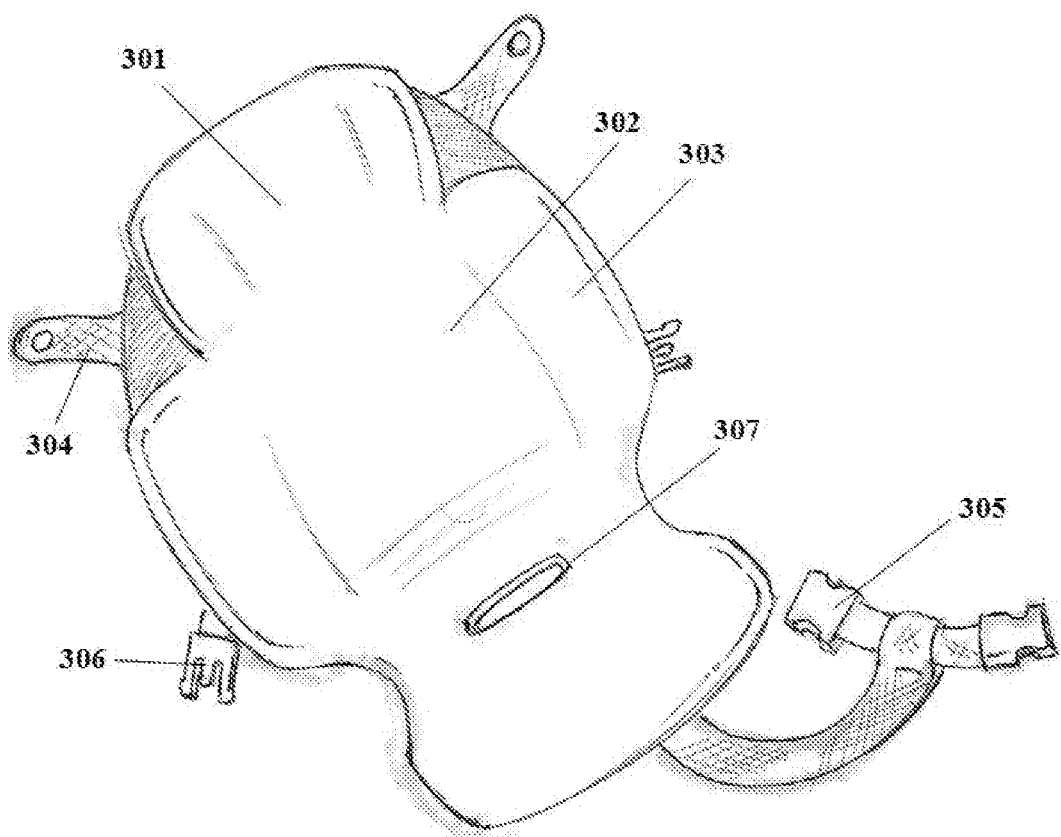
FIG. 3 shows a representative image of a safety seat liner having a pair of snaps for attaching the liner to a harness and male and female clips for securing a child or animal within the liner.

Referring to FIG. 3, for example, the safety seat liner comprises a head support member 301, a body support member 302, and a pair of side members 303. As shown here, the head support member 301, the body support member 302, and each side edge 303 are a single component. The head support member 301 comprises a pair of first attachment members 304, the body support member 302 comprises a pair of female clips 305, and each side member 303 comprises a pair of male clips 306. Accordingly, the female clips 305 are configured for engagement with the male clips 306. In this way, the child can be secured within the liner and then positioned within a seat member located on the harness (see e.g., FIG. 5). As shown here, the surface of the body support member 302 defines an inner edge 306, which defines a hole through which the seatbelt of a car seat can be accessed.

In a further aspect, the liner comprises: (a) a head support member comprising a pair of first attachment members; and (b) a body support member connected to the head support member, wherein the body support member comprises a surface and a bottom edge. In a still further aspect, the body support member comprises a pair of second attachment members. In yet a further aspect, the liner further comprises a pair of side members connected to the body support member, wherein each side member comprises a second attachment member.

In a further aspect, the head support member and the body support member are a single component. In a still further aspect, the head support member and the body support member are different components.

In a further aspect, the head support member, the body support member, and the pair of side members are a single component. In a still further aspect, the body support member and the pair of side members are a single component. In yet a further aspect, the body support member and the pair of side members are different components. In an even further aspect, the head support member, the body support member, and the pair of side members are different components.

In various aspects, additional elements may be incorporated into the safety seat liner. For example, an additional element may be incorporated in between the mammal and the safety seat liner. Alternatively, an additional element may be incorporated into the safety seat liner itself Examples of additional elements include, but are not limited to, mesh, padding, plastic, and foam.

a. Head Support Member

In a further aspect, the safety seat liner comprises a head support member comprising a pair of first attachment members. In various aspects, the head support member is configured to support a child's head. For example, the head support member can support the back and/or sides of a child's head.

The head support member can be formed of any suitable material that provides good cushioning. Exemplary materials include, but are not limited to, waterproof nylon, flannel, and elastic fabrics such as spandex or cotton-spandex blends.

The head support member can optionally be filled with a compressible, resilient material. Exemplary fillers include, but are not limited to, polyester fiberfill, down feathers, memory foam, and polystyrene pellets. In various aspects, the head support member can optionally comprise an inflatable inner liner.

It is contemplated that the pair of first attachment members can be different attachment members. For example, one first attachment member can be a ring and the second first attachment member can be a clip. Thus, in a further aspect, each first attachment member is individually selected from a ring and a clip. In a still further aspect, each first attachment member is a ring. In yet a further aspect, each first attachment member is a clip. In an even further aspect, the clip is selected from a carabiner, a swivel-hook, a snap, a snap-hook, a bulldog clip, a trigger hook, and a hook.

In a further aspect, each first attachment member together with a second attachment member comprises a loop.

In a further aspect, the head support member has a width of from about 7 inches to about 14 inches. In a still further aspect, the head support member has a width of from 2 inches to about 25 inches. In yet a further aspect, the head support member has a width of from 5 inches to about 20 inches. In an even further aspect, the head support member has a width of from 7 inches to about 15 inches. In a still further aspect, the head support member has a width of from 9 inches to about 12 inches. In yet a further aspect, the head support member has a width of from 20 inches to about 25 inches. In an even further aspect, the head support member has a width of from 15 inches to about 20 inches. In a still further aspect, the head support member has a width of from 10 inches to about 15 inches. In yet a further aspect, the head support member has a width of from 5 inches to about 10 inches.

In a further aspect, the entire head support member has a single width. In a still further aspect, the entire head support member has a range of widths.

b. Body Support Member

In a further aspect, the safety seat liner comprises a body support member connected to the head support member, wherein the body support member comprises a surface and a bottom edge. In various aspects, the body support member is configured to support a child's body. For example, the body support member can support the back and/or sides of a child's body.

The body support member can be formed of any suitable material that provides good cushioning. Exemplary materials include, but are not limited to, waterproof nylon, flannel, and elastic fabrics such as spandex or cotton-spandex blends.

The body support member can optionally be filled with a compressible, resilient material. Exemplary fillers include, but are not limited to, polyester fiberfill, down feathers, memory foam, and polystyrene pellets. In various aspects, the body support member can optionally comprise an inflatable inner liner.

In a further aspect, the surface of the body support member defines an inner edge and the inner edge defines a hole. In a still further aspect, the surface of the body support member in combination with the top edge of the circular member defines an inner edge and wherein the inner edge defines a hole.

In a further aspect, the body support member comprises a pair of second attachment members. It is contemplated that the pair of second attachment members can be different attachment members. For example, one second attachment member can be a ring and the second attachment member can be a clip. Thus, in a still further aspect, each second attachment member is individually selected from a ring and a clip. In yet a further aspect, each second attachment member is a ring. In an even further aspect, each second attachment member is a clip. In a still further aspect, the clip is selected from a carabiner, a swivel-hook, a snap, a snap-hook, a bulldog clip, a trigger hook, and a hook.

In a further aspect, the body support member further comprises a pair of fifth attachment members. It is contemplated that the pair of fifth attachment members can be different attachment members. For example, one fifth attachment member can be a ring and the second fifth attachment member can be a clip. Thus, in a still further aspect, each fifth attachment member is individually selected from a ring and a clip. In yet a further aspect, each fifth attachment member is a ring. In an even further aspect, each fifth attachment member is a clip. In a still further aspect, the clip is selected from a carabiner, a swivel-hook, a snap, a snap-hook, a bulldog clip, a trigger hook, and a hook.

In a further aspect, each first attachment member together with a second attachment member comprises a loop.

In a further aspect, the body support member has a width of from about 7 inches to about 17 inches. In a still further aspect, the body support member has a width of from about 5 inches to about 30 inches. In yet a further aspect, the body support member has a width of from about 7 inches to about 25 inches. In an even further aspect, the body support member has a width of from about 9 inches to about 20 inches. In a still further aspect, the body support member has a width of from about 11 inches to about 15 inches. In yet a further aspect, the body support member has a width of from about 25 inches to about 30 inches. In an even further aspect, the body support member has a width of from about 20 inches to about 25 inches. In a still further aspect, the body support member has a width of from about 15 inches to about 20 inches. In yet a further aspect, the body support member has a width of from about 10 inches to about 15 inches. In an even further aspect, the body support member has a width of from about 5 inches to about 10 inches.

In a further aspect, the entire body support member has a single width. In a still further aspect, the entire body support member has a range of widths.

C. Side Members

In a further aspect, the safety seat liner further comprises a pair of side members connected to the body support member, wherein each side member comprises a second attachment member. In various aspects, each side member is configured to support a child's body. For example, each side member can support a side of a child's body. It is contemplated that the pair of side members can be different side members. For example, each side member can be a different shape.

Each side member can be formed of any suitable material that provides good cushioning. Exemplary materials include, but are not limited to, waterproof nylon, flannel, and elastic fabrics such as spandex or cotton-spandex blends.

Each side member can optionally be filled with a compressible, resilient material. Exemplary fillers include, but are not limited to, polyester fiberfill, down feathers, memory foam, and polystyrene pellets. In various aspects, each side member can optionally comprise an inflatable inner liner.

it is contemplated that the pair of second attachment members can be different attachment members. For example, one second attachment member can be a ring and the second attachment member can be a clip. Thus, in a further aspect, each second attachment member is individually selected from a ring and a clip, in a still further aspect, each second attachment member is a ring. In yet a further aspect, each second attachment member is a clip. In an even further aspect, the clip is selected from a carabiner, a swivel-hook, a snap, a snap-hook, a bulldog clip, a trigger hook, and a hook.

In a further aspect, each first attachment member together with a second attachment member comprises a loop.

2. Harness

In one aspect, the disclosed safety seat system comprises a harness dimensioned to fit an adult wearer.

In one aspect, disclosed is a harness comprising: (a) a pair of straps configured to encircle a wearer's shoulders, wherein each strap comprises a first end, a second end, and a center portion comprising a third attachment member; and (b) a circular member configured to encircle a wearer's waist, wherein the circular member comprises an outer surface, an inner surface, and a top edge, and wherein the circular member is connected to the first end of each strap, wherein the harness is dimensioned to fit an adult wearer; and wherein the harness is configured to reversibly attach to a safety seat liner dimensioned to support a child in a car seat.

In one aspect, disclosed is a harness comprising: (a) a pair of straps configured to encircle a wearer's shoulders, wherein each strap comprises a first end, a second end, and a center portion comprising a third attachment member and a fourth attachment member; and (b) a back support member connected to the first end and the second end of each strap, wherein the harness is dimensioned to fit an adult wearer; and wherein the harness is configured to reversibly attach to a safety seat liner dimensioned to support a child in a car seat.

In one aspect, the harness can comprise a pair of straps configured to encircle a wearer's shoulders. In a further aspect, the harness can comprise a pair of straps configured to encircle a wearer's neck. In a still further aspect, the harness can comprise a single strap configured to encircle a wearer's shoulder.

Figure 4:
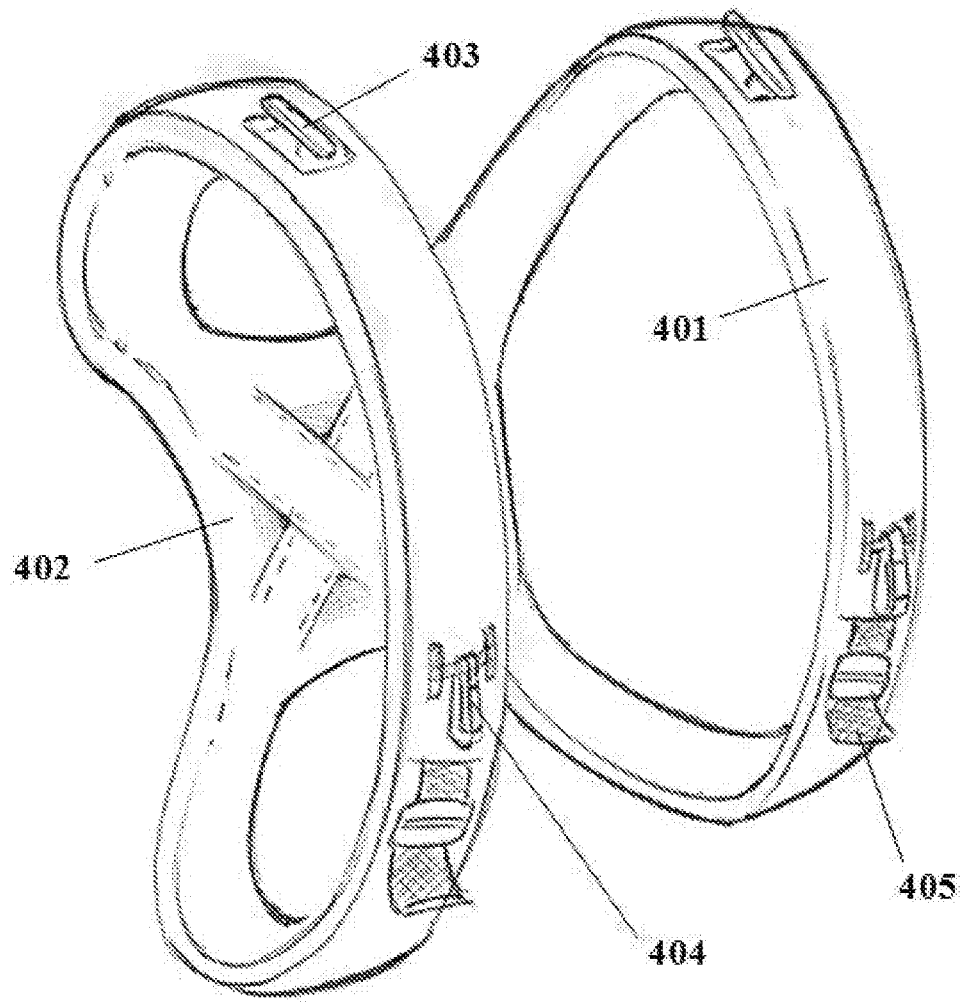
FIG. 4 shows a representative image of a harness having a pair of straps and a back support member.

Referring to FIG. 4, for example, the harness comprises a pair of straps 401 and a back support member 402. As shown here, each strap 401 comprises a hook 403 configured for engagement with a first engagement member, thereby allowing the harness to be reversibly attached to the head support member of the safety seat liner. Each strap 401 further comprises a clip 404 configured for engagement with a second attachment member, thereby allowing the harness to be reversibly attached to the body support member or to each side member of the safety seat liner. As shown here, the each strap 401 also comprises an adjusting member 405 that allows for the straps to be tightened around the wearer's shoulders.

Figure 5:
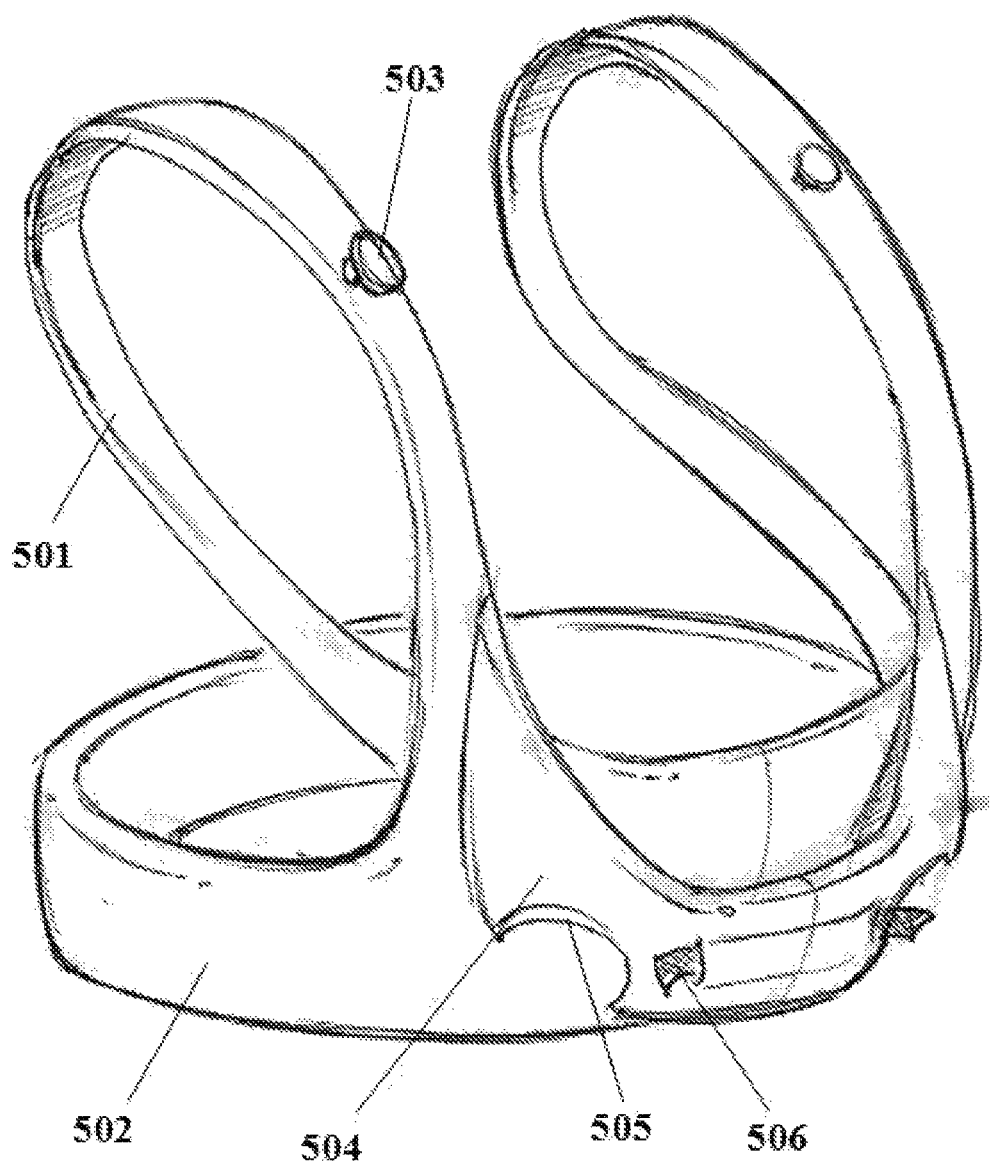
FIG. 5 shows a representative image of a harness having a pair of straps, a circular member, and a seat member.

Referring to FIG. 5, for example, the harness comprises a pair of straps 501 and a belt 502. Each strap 501 comprises an attachment member 503 configured for engagement with a first engagement member, thereby allowing the harness to be reversibly attached to the head support member of the safety seat liner.

Figure 9:
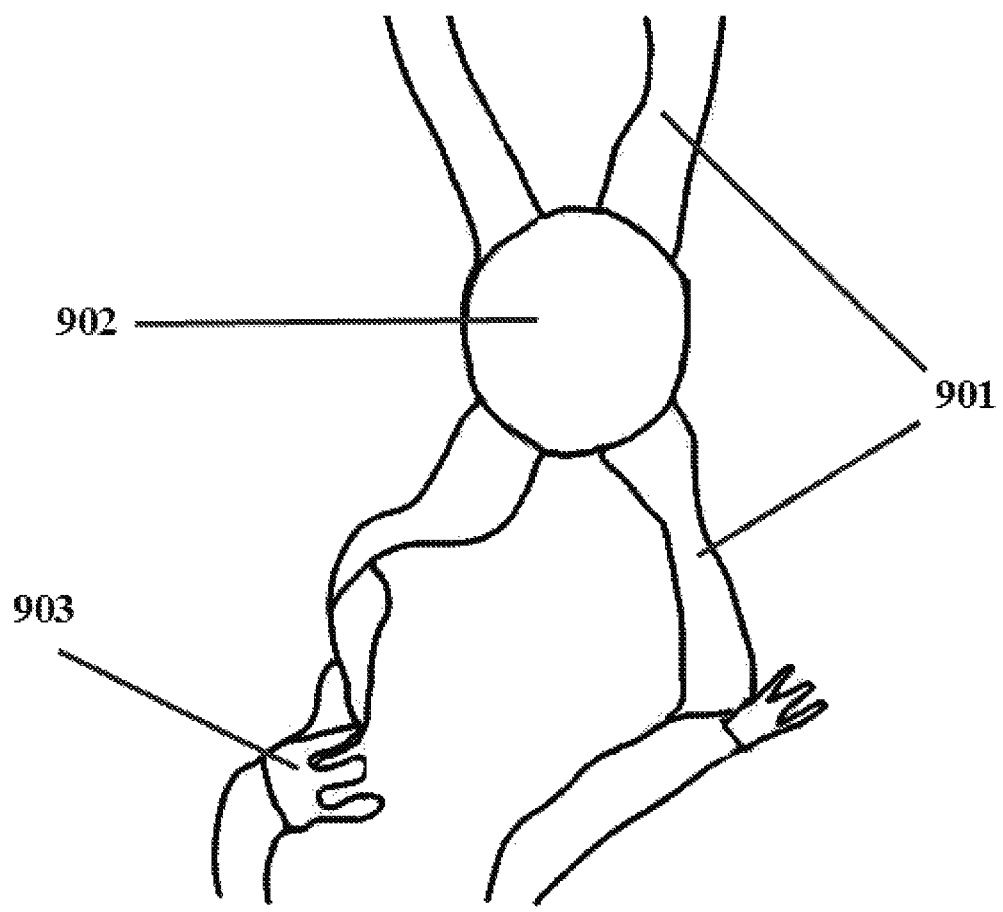
FIG. 9 shows a representative image of a harness having a pair of straps, a back support member, and a pair of male components of a side release buckle for attaching the harness to the safety seat liner.

Referring to FIG. 9, for example, the harness comprises a pair of straps 901 and a back support member 902. Each strap 901 comprises an attachment member 903 configured for engagement with a second engagement member, thereby allowing the harness to be reversibly attached to the body support member of the safety seat liner. As shown here, attachment members 903 can comprise the male component of a side release buckle but other attachment members such as, for example, a clip and a snap, are also envisioned.

In a further aspect, the harness further comprises a pair of opposite end fasteners configured to reversibly attach to each other. In a still further aspect, the opposite end fasteners comprise straps. In yet a further aspect, one opposite end fastener is a ring and the other opposite end fastener is a clip.

a. Pair of Straps

In a further aspect, the harness comprises a pair of straps configured to encircle a wearer's shoulders, wherein each strap comprises a third attachment member configured for engagement with a first attachment member. In a still further aspect, the straps are configured to tie and thus, no additional attachment member is needed. Thus, in various aspects, by "configured to encircle" it is meant that each strap is made to go around, such that the harness is suspended from the shoulder. Each strap can be configured to wrap around all or a portion of a wearer's shoulders, thereby supporting the child or animal along the wearer's back, chest, and/or shoulder area. For example, each strap can encircle the wearer's entire shoulder or each strap can encircle a portion of the wearer's shoulder. In this way, the wearer's hands remain free and the child or animal's weight does not impede the wearer's upper body mobility.

In a further aspect, the straps are retractable. Briefly, a retractable strap may extend from, for example, a coiled holder attached to the safety seat system. For example, the holder may be attached to the safety seat liner. In a further example, the holder may be attached to the harness. In this way, the straps can be extended from the coiled holder and set to any desired length. In a still further aspect, the strap may be locked at the desired length by the coiled holder for as long as desired. In this way, the straps do not provide a significant increase in weight or bulk, nor substantially increase the risk of their becoming an encumbrance or a hazard to the well-being of the mammal when it is not in use.

In a further aspect, the straps are "stow away" straps. For example, the straps may "stow away" or be hidden within the safety seat liner.

In a further aspect, the harness comprises a pair of straps configured to encircle a wearer's shoulders, wherein each strap comprises a first end, a second end, and a center portion comprising a third attachment member. In a still further aspect, the third attachment member is configured for engagement with a first attachment member.

In a further aspect, the harness comprises a pair of straps configured to encircle a wearer's shoulders, wherein each strap comprises a first end, a second end, and a center portion comprising a third attachment member and a fourth attachment member. In a still further aspect, the third attachment member is configured for engagement with a first attachment member. In yet a further aspect, the fourth attachment member is configured for engagement with a second attachment member. In an even further aspect, the third attachment member is configured for engagement with a first attachment member and the fourth attachment member is configured for engagement with a second attachment member.

In a further aspect, each strap comprises a third attachment member configured for engagement with a second attachment member. Thus, it should be understood that in various aspects, each third attachment member in combination with a first attachment member is configured to reversibly attach the head support member to each strap.

It is contemplated that the pair of third attachment members can be different attachment members. For example, one third attachment member can be a ring and the second third attachment member can be a clip. Thus, in a still further aspect, each third attachment member is individually selected from a ring and a clip. In yet a further aspect, each third attachment member is a ring. In an even further aspect, each third attachment member is a clip. In a still further aspect, the clip is selected from a carabiner, a swivel-hook, a snap, a snap-hook, a bulldog clip, a trigger hook, and a hook.

In a further aspect, each strap further comprises a fourth attachment member configured for engagement with a second attachment member. Thus, it should be understood that in various aspects, each fourth attachment member in combination with a second attachment member is configured to reversibly attach the body support member or each side member to each strap.

It is contemplated that the pair of fourth attachment members can be different attachment members. For example, one fourth attachment member can be a ring and the second fourth attachment member can be a clip. Thus, in a still further aspect, each fourth attachment member is individually selected from a ring and a clip. In yet a further aspect, each fourth attachment member is a ring. In an even further aspect, each fourth attachment member is a clip. In a still further aspect, the clip is selected from a carabiner, a swivel-hook, a snap, a snap-hook, a bulldog clip, a trigger hook, and a hook.

In a further aspect, each strap further comprises a sixth attachment member configured for engagement with a fifth attachment member. Thus, it should be understood that in various aspects, each sixth attachment member in combination with a fifth attachment member is configured to reversibly attach the body support member to each strap.

It is contemplated that the pair of sixth attachment members can be different attachment members. For example, one sixth attachment member can be a ring and the second sixth attachment member can be a clip. Thus, in a still further aspect, each sixth attachment member is individually selected from a ring and a clip. In yet a further aspect, each sixth attachment member is a ring. In an even further aspect, each sixth attachment member is a clip. In a still further aspect, the clip is selected from a carabiner, a swivel-hook, a snap, a snap-hook, a bulldog clip, a trigger hook, and a hook.

In a further aspect, each strap has a length of about 48 inches. In a still further aspect, each strap has a length of from about 20 inches to about 60 inches. In yet a further aspect, each strap has a length of from about 25 inches to about 55 inches. In an even further aspect, each strap has a length of from about 30 inches to about 50 inches. In a still further aspect, each strap has a length of from about 35 inches to about 45 inches. In yet a further aspect, each strap has a length of from about 55 inches to about 60 inches. In an even further aspect, each strap has a length of from about 50 inches to about 55 inches. In a still further aspect, each strap has a length of from about 45 inches to about 50 inches. In yet a further aspect, each strap has a length of from about 40 inches to about 45 inches. In an even further aspect, each strap has a length of from about 35 inches to about 40 inches. In a still further aspect, each strap has a length of from about 30 inches to about 35 inches. In yet a further aspect, each strap has a length of from about 25 inches to about 30 inches.

In a further aspect, each strap has a width of from about 2 inches to about 2.5 inches. In a still further aspect, each strap has a width of from about 0.25 inches to about 5 inches. In yet a further aspect, each strap has a width of from about 0.5 inches to about 5 inches. In an even further aspect, each strap has a width of from about 1 inch to about 4 inches. In a still further aspect, each strap has a width of from about 2 inches to about 3 inches. In yet a further aspect, each strap has a width of from about 4 inches to about 5 inches. In an even further aspect, each strap has a width of from about 3 inches to about 4 inches. In a still further aspect, each strap has a width of from about 1 inch to about 2 inches. In yet a further aspect, each strap has a width of from about 0.25 inches to about 1 inch.

b. Circular Member

In a further aspect, the harness comprises a circular member configured to encircle a wearer's waist, wherein the circular member comprises an inner surface, an outer surface, and a top edge. Thus, in various aspects, the circular member is configured to wrap around the wearer's waist and/or hips, thereby supporting the child or animal along the wearer's back, waist, pelvis, and/or buttocks area. In this way, the wearer's hands remain free and the child or animal's weight does not impede the wearer's upper body mobility.

In a further aspect, the circular member further comprises a closing member. Examples of closing members include, but are not limited to, a buckle, a clasp, a catch, a clip, and hook-and-loop strips.

In a further aspect, the circular member is retractable. Briefly, a retractable circular member may extend from, for example, a coiled holder attached to the safety seat system. For example, the holder may be attached to the safety seat liner. In a further example, the holder may be attached to the harness. In this way, the circular member can be extended from the coiled holder and set to any desired length. In a still further aspect, the circular member may be locked at the desired length by the coiled holder for as long as desired. In this way, the circular member does not provide a significant increase in weight or bulk, nor substantially increase the risk of it becoming an encumbrance or a hazard to the well-being of the mammal when it is not in use.

In a further aspect, the circular member further comprises a pair of sixth attachment members configured for engagement with a fifth attachment member. It is contemplated that the pair of sixth attachment members can be different attachment members. For example, one sixth attachment member can be a ring and the second sixth attachment member can be a clip. Thus, in a still further aspect, each sixth attachment member is individually selected from a ring and a clip. In yet a further aspect, each sixth attachment member is a ring. In an even further aspect, each sixth attachment member is a clip. In a still further aspect, the clip is selected from a carabiner, a swivel-hook, a snap, a snap-hook, a bulldog clip, a trigger hook, and a hook.

In a further aspect, the circular member is connected to the body support member. In a still further aspect, connected is via a seam. In yet a further aspect, connected is via an attachment member.

In a further aspect, the surface of the body support member in combination with the top edge of the circular member defines an inner edge and the inner edge defines a hole.

In a further aspect, the circular member is connected to each strap. In a still further aspect, connected is via a seam. In yet a further aspect, connected is via an attachment member. In an even further aspect, the front end and the back end of each strap are joined at about the same point on the circular member. In a still further aspect, the front end and the back end of each strap are joined at a different point on the circular member.

In a further aspect, the circular member further comprises a seat member connected to the outer surface of the circular member, wherein the seat member comprises an inner surface, wherein the inner surface defines a pair of inner edges, and wherein each inner edge in combination with the outer surface of the circular member defines a hole.

Referring to FIG. 5, for example, the harness comprises a pair of straps 501 and a belt 502. The belt 502 further comprises a seat member 504 configured to accommodate a child sitting therein. Specifically, the seat member 504 comprises an inner surface that defines a pair of inner edges 505. Each inner edge 505 in combination with the outer surface of the belt 502 defines a hole. Thus, it should be understood that a child can sit within the seat member with each of their legs positioned through a hole. The seat member 504 further comprises an adjusting member 506 that allows for the seat member 504 to be tightened so as to support and contain a child.

In a further aspect, the circular member further comprises a bag connected to the inner surface of the circular member, wherein the bag comprises an interior compartment comprising a front wall opposing a rear wall, two opposing side walls, and a bottom surface, wherein the rear wall is reversibly attached to the front wall, thereby defining a reclosable access opening into the bag interior. In a still further aspect, reversibly attached is via a zipper. In yet a further aspect, reversibly attached is via a pair of snaps. In an even further aspect, reversibly attached is via a button and a buttonhole. In a still further aspect, the bag further comprises a garment configured to cover the head support member, the body support member, and each side member.

Figure 6:
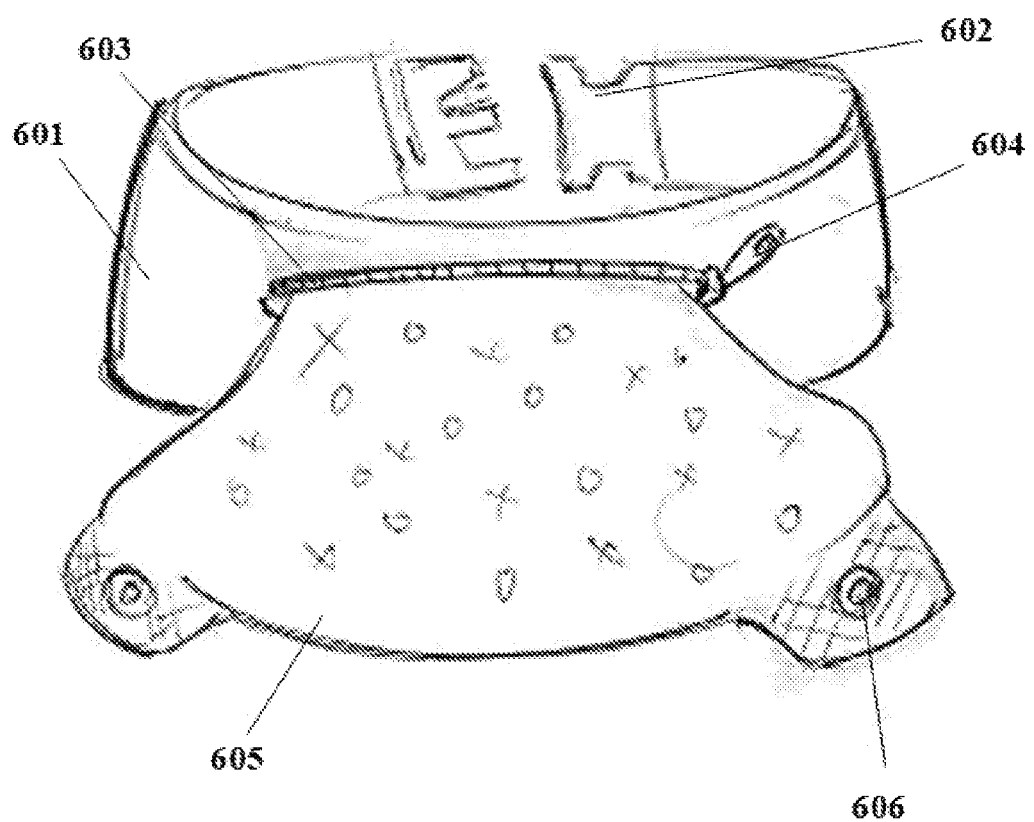
FIG. 6 shows a representative image of a belt having a bag, within which is contained a garment.

Referring to FIG. 6, for example, the belt 601 comprises clip 602 and a bag having a rear wall reversibly attached a front wall, thereby defining a reclosable access 603. As shown here, the reclosable access 603 is reversibly attached via a zipper 604. A garment 605 is contained within the bag. The garment 605 is configured to cover a safety seat liner. Additionally, the garment 605 comprises a pair of attachment members 606, which enable the garment to be connected to the liner.

In a further aspect, the circular member has a length of about 44 inches. In a still further aspect, the circular member has a length of from about 20 inches to about 60 inches. In yet a further aspect, the circular member has a length of from about 25 inches to about 55 inches. In an even further aspect, the circular member has a length of from about 30 inches to about 50 inches. In a still further aspect, the circular member has a length of from about 35 inches to about 45 inches. In yet a further aspect, the circular member has a length of from about 55 inches to about 60 inches. In an even further aspect, the circular member has a length of from about 50 inches to about 55 inches. In a still further aspect, the circular member has a length of from about 45 inches to about 50 inches. In yet a further aspect, the circular member has a length of from about 40 inches to about 45 inches. In an even further aspect, the circular member has a length of from about 35 inches to about 40 inches. In a still further aspect, the circular member has a length of from about 30 inches to about 35 inches. In yet a further aspect, the circular member has a length of from about 25 inches to about 30 inches.

In a further aspect, the circular member has a width of from about 2 inches to about 2.5 inches. In a still further aspect, the circular member has a width of from about 0.25 inches to about 5 inches. In yet a further aspect, the circular member has a width of from about 0.5 inches to about 5 inches. In an even further aspect, the circular member has a width of from about 1 inch to about 4 inches. In a still further aspect, the circular member has a width of from about 2 inches to about 3 inches. In yet a further aspect, the circular member has a width of from about 4 inches to about 5 inches. In an even further aspect, the circular member has a width of from about 3 inches to about 4 inches. In a still further aspect, the circular member has a width of from about 1 inch to about 2 inches. In yet a further aspect, the circular member has a width of from about 0.25 inches to about 1 inch.

C. Back Support Member

In a further aspect, the harness further comprises a back support member connected to each strap. Thus, in various aspects, the back support member is configured to reinforce the wearer's back, thereby supporting the child or animal along the wearer's back, and/or shoulder area. In this way, the wearer's hands remain free and the child or animal's weight does not impede the wearer's upper body mobility.

In a further aspect, the back support member is connected to the first end and the second end of each strap.

In a further aspect, each strap further comprises a fourth attachment member configured for engagement with a second attachment member. Thus, it should be understood that in various aspects, each fourth attachment member in combination with a second attachment member is configured to reversibly attach the body support member or each side member to the back support member.

It is contemplated that the pair of fourth attachment members can be different attachment members. For example, one fourth attachment member can be a ring and the second fourth attachment member can be a clip. Thus, in a still further aspect, each fourth attachment member is individually selected from a ring and a clip. In yet a further aspect, each fourth attachment member is a ring. In an even further aspect, each fourth attachment member is a clip. In a still further aspect, the clip is selected from a carabiner, a swivel-hook, a snap, a snap-hook, a bulldog clip, a trigger hook, and a hook.

In a further aspect, the back support member has a width of from about 5 inches to about 7 inches. In a still further aspect, the back support member has a width of from about 1 inch to about 25 inches. In yet a further aspect, the back support member has a width of from about 5 inches to about 25 inches. In an even further aspect, the back support member has a width of from about 7 inches to about 20 inches. In a still further aspect, the back support member has a width of from about 9 inches to about 15 inches. In yet a further aspect, the back support member has a width of from about 11 inches to about 15 inches. In an even further aspect, the back support member has a width of from about 20 inches to about 25 inches. In a still further aspect, the back support member has a width of from about 15 inches to about 20 inches. In yet a further aspect, the back support member has a width of from about 10 inches to about 15 inches. In an even further aspect, the back support member has a width of from about 5 inches to about 10 inches.

In a further aspect, the back support member has a length of about 8 inches. In a still further aspect, the back support member has a length of from about 5 inches to about 30 inches. In yet a further aspect, the hack support member has a length of from about 5 inches to about 25 inches. In an even further aspect, the back support member has a length of from about 5 inches to about 20 inches. In a still further aspect, the back support member has a length of from about 5 inches to about 15 inches. In yet a further aspect, the back support member has a length of from about 5 inches to about 10 inches.

In a further aspect, the entire back support member has a single width. In a still further aspect, the entire back support member has a range of widths.

d. Side Members

In a further aspect, the harness further comprises a pair of side members connected to the harness, wherein each side member comprises a fourth attachment member configured for engagement with a second attachment member. In various aspects, each side member is configured to support a child's body. For example, each side member can support a side of a child's body. It is contemplated that the pair of side members can be different side members. For example, each side member can be a different shape.

Each side member can be formed of any suitable material that provides good cushioning. Exemplary materials include, but are not limited to, waterproof nylon, flannel, and elastic fabrics such as spandex or cotton-spandex blends.

Each side member can optionally be filled with a compressible, resilient material. Exemplary fillers include, but are not limited to, polyester fiberfill, down feathers, memory foam, and polystyrene pellets. In various aspects, each side member can optionally comprise an inflatable inner liner.

It is contemplated that the pair of fourth attachment members can be different attachment members. For example, one fourth attachment member can be a ring and the second fourth attachment member can be a clip. Thus, in a further aspect, each fourth attachment member is individually selected from a ring and a clip. In a still further aspect, each fourth attachment member is a ring. In yet a further aspect, each fourth attachment member is a clip. In an even further aspect, the clip is selected from a carabiner, a swivel-hook, a snap, a snap-hook, a bulldog clip, a trigger hook, and a hook.

C. Methods of Making a Safety Seat System

In one aspect, disclosed are methods of making a safety seat system, the method comprising attaching a safety seat liner dimensioned to support a child in a car seat and a harness dimensioned to fit an adult wearer, wherein the liner and the harness each comprise multiple opposite end fasteners configured to reversibly attach the liner and the harness to each other, thereby making a safety seat system.

In a further aspect, attaching is via a seam. In a still further aspect, attaching is via engagement of at least one pair of opposite end fasteners.

In a further aspect, the safety seat liner comprises: (a) a head support member comprising a pair of first attachment members; (b) a body support member connected to the head support member, wherein the body support member comprises a surface and a bottom edge; (c) a pair of side members connected to the body support member, wherein each side member comprises a second attachment member, wherein the safety seat liner is dimensioned to support a child in a car seat; and wherein the safety seat liner is configured to reversibly attach to a harness dimensioned to fit an adult wearer.

In a further aspect, the safety seat liner comprises: (a) a head support member comprising a pair of first attachment members; and (b) a body support member connected to the head support member, wherein the body support member comprises a surface and a bottom edge. In a still further aspect, the body support member comprises a pair of second attachment members. In yet a further aspect, the liner further comprises a pair of side members connected to the body support member, wherein each side member comprises a second attachment member.

In a further aspect, the harness comprises: (a) a pair of straps configured to encircle a wearer's shoulders, wherein each strap comprises a first end, a second end, and a center portion comprising a third attachment member; and (b) a circular member configured to encircle a wearer's waist, wherein the circular member comprises an outer surface, an inner surface, and a top edge, and wherein the circular member is connected to the first end of each strap, wherein the harness is dimensioned to fit an adult wearer; and wherein the harness is configured to reversibly attach to a safety seat liner dimensioned to support a child in a car seat.

In a further aspect, the harness comprises: (a) a pair of straps configured to encircle a wearer's shoulders, wherein each strap comprises a first end, a second end, and a center portion comprising a third attachment member and a fourth attachment member; and (b) a hack support member connected to the first end and the second end of each strap, wherein the harness is dimensioned to fit an adult wearer; and wherein the harness is configured to reversibly attach to a safety seat liner dimensioned to support a child in a car seat.

D. Methods of Supporting a Mammal

In one aspect, disclosed are methods of supporting a mammal comprising supporting the mammal in a disclosed safety seat system. Thus, in one aspect, disclosed are methods of supporting a mammal, the method comprising supporting the mammal in a safety seat system comprising: (a)

a safety seat liner dimensioned to support a child in a car seat; and (b) a harness dimensioned to fit an adult wearer, wherein the liner and the harness each comprise multiple opposite end fasteners configured to reversibly attach the liner and the harness to each other, thereby supporting the mammal.

In a further aspect, the mammal is a human. In a still further aspect, the human is a child. In yet a further aspect, the child is an infant.

In a further aspect, the mammal is an animal. In a still further aspect, the animal is selected from a dog, a cat, a guinea pig, a ferret, and a monkey.

E. Kits

In one aspect, disclosed are kits comprising a safety seat liner comprising: (a) a head support member comprising a pair of first attachment members; (b) a body support member connected to the head support member, wherein the body support member comprises a surface and a bottom edge; (c) a pair of side members connected to the body support member, wherein each side member comprises a second attachment member, wherein the safety seat liner is dimensioned to support a child in a car seat; and wherein the safety seat liner is configured to reversibly attach to a harness dimensioned to fit an adult wearer, and one or more of: (a) a harness dimensioned to fit an adult wearer; (b) a child's car seat or a stroller; (c) instructions for attaching the safety seat liner and the harness; (d) instructions for inserting the safety seat liner into the car seat or the stroller; (e) instructions for wearing the harness; and (f) instructions for supporting a mammal.

In one aspect, disclosed are kits comprising a harness comprising: (a) a pair of straps configured to encircle a wearer's shoulders, wherein each strap comprises a first end, a second end, and a center portion comprising a third attachment member; and (b) a circular member configured to encircle a wearer's waist, wherein the circular member comprises an outer surface, an inner surface, and a top edge, and wherein the circular member is connected to the first end of each strap, wherein the harness is dimensioned to fit an adult wearer; and wherein the harness is configured to reversibly attach to a safety seat liner dimensioned to support a child in a car seat, and one or more of: (a) safety seat liner dimensioned to support a child in a car seat; and wherein the safety seat liner is configured to reversibly attach to a harness dimensioned to fit an adult wearer; (b) a child's car seat or a stroller; (c) instructions for attaching the safety seat liner and the harness; (d) instructions for inserting the safety seat liner into the car seat or the stroller; (e) instructions for wearing the harness; and (f) instructions for supporting a mammal.

In one aspect, disclosed are kits comprising a harness comprising: (a) a pair of straps configured to encircle a wearer's shoulders, wherein each strap comprises a first end, a second end, and a center portion comprising a third attachment member and a fourth attachment member; and (b) a back support member connected to the first end and the second end of each strap, wherein the harness is dimensioned to fit an adult wearer; and wherein the harness is configured to reversibly attach to a safety seat liner dimensioned to support a child in a car seat, and one or more of: (a) safety seat liner dimensioned to support a child in a car seat; and wherein the safety seat liner is configured to reversibly attach to a harness dimensioned to fit an adult wearer; (b) a child's car seat or a stroller; (c) instructions for attaching the safety seat liner and the harness; (d) instructions for inserting the safety seat liner into the car seat or the stroller; (e) instructions for wearing the harness; and (f) instructions for supporting a mammal.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A safety seat liner comprising:
    (a) a head support member;
    (b) a body support member, wherein the body support member is connected to the head support member, wherein the body support member comprises a surface and a bottom edge, wherein the surface defines an inner edge, wherein the inner edge defines a hole, and wherein substantially all of the surface contacts a child, when in use as a carrier; and
    (c) a circular member connected to the body supported member, wherein the circular member is configured to encircle an adult wearer's waist and/or hips,
    wherein the safety seat liner is dimensioned to support a child in a car seat,
    wherein the body support member comprises a range of different widths relative to an x-axis that runs in a direction parallel to the circular member,
    wherein a single location on the body support member has a width relative to the x-axis that is narrower than the widths of all other locations on the body support member relative to the x-axis, and
    wherein the entirety of the hole is between the single location on the body support member and the circular member relative to a y-axis that runs in a direction perpendicular to the circular member.

2. The safety seat liner of claim 1, further comprising a child's car seat.

3. The safety seat liner of claim 2, wherein the safety seat liner is in direct contact with the child's car seat.

4. The safety seat liner of claim 1, wherein the body support member further comprises a vertical stitch configured to contour to a child's lower back and/or bottom.

5. The safety seat liner of claim 1, wherein the body support member further comprises two vertical stitches configured to contour to a child's lower back and/or bottom.

6. The safety seat liner of claim 1, wherein the circular member has a length of from about 30 inches to about 60 inches.

7. The safety seat liner of claim 1, wherein the circular member has a length of about 44 inches.

8. The safety seat liner of claim 1, wherein the circular member has a width of from about 0.25 inches to about 3 inches.

9. The safety seat liner of claim 1, wherein the circular member has a width of from about 2 inches to about 2.5 inches.

10. The safety seat liner of claim 1, wherein the hole is the only hole within the body support member.

11. The safety seat liner of claim 1, further comprising a child's car seat.

12. The safety seat liner of claim 11, wherein the safety seat liner is in direct contact with the child's car seat.

13. The safety seat liner of claim 1, wherein the body support member further comprises a vertical stitch configured to contour to a child's lower back and/or bottom.

14. The safety seat liner of claim 1, wherein the body support member further comprises two vertical stitches configured to contour to a child's lower back and/or bottom.

15. The safety seat liner of claim 1, wherein the circular member has a length of from about 30 inches to about 60 inches.

16. The safety seat liner of claim 1, wherein the circular member has a length of about 44 inches.

17. The safety seat liner of claim 1, wherein the circular member has a width of from about 0.25 inches to about 3 inches.

18. The safety seat liner of claim 1, wherein the circular member has a width of from about 2 inches to about 2.5 inches.

19. A safety seat liner comprising:
(a) a head support member;
(b) a body support member connected to the head support member, wherein the body support member comprises a surface and a bottom edge, wherein the surface defines an inner edge, wherein the inner edge defines a hole and wherein substantially all of the surface contacts a child, when in use as a carrier; and
(c) a circular member connected to the body supported member at a location between the hole and the head support member, wherein the circular member is configured to encircle an adult wearer's waist and/or hips, wherein the circular member has a length of from about 30 inches to about 60 inches and a width of from about 0.25 inches to about 3 inches,
wherein the safety seat liner is dimensioned to support a child in a car seat,
wherein the body support member comprises a range of different widths relative to an x-axis that runs in a direction parallel to the circular member,
wherein a single location on the body support member has a width relative to the x-axis that is narrower than the widths of all other locations on the body support member relative to the x-axis,
wherein the entirety of the hole is between the single location on the body support member and the circular member relative to a y-axis that runs in a direction perpendicular to the circular member,
wherein the circular member has a length of from about 30 inches to about 60 inches and a width of from about 0.25 inches to about 3 inches, and
wherein the body support member further comprises a vertical stitch configured to contour to a child's lower back and/or bottom.

20. A safety seat liner comprising:
(a) a head support member;
(b) a first body support member connected to the head support member, wherein the first body support member comprises a surface, wherein the surface defines an inner edge, wherein the inner edge defines a hole, and wherein substantially all of the surface contacts a child, when in use as a carrier;
(c) a second body support member connected to the first body support member at a location that is narrower than the entirety of the first body support member relative to an x-axis that runs in a direction parallel to the circular member; and
(c) a circular member connected to the first body supported member, wherein the circular member is configured to encircle an adult wearer's waist and/or hips,
wherein the safety seat liner is dimensioned to support a child in a car seat, and
wherein the entirety of the hole is between the circular member and the location at which the second body support member is connected to the first body support member relative to a y-axis that runs in a direction perpendicular to the circular member.

* * * * *